(12) United States Patent
Wang et al.

(10) Patent No.: US 12,185,318 B2
(45) Date of Patent: Dec. 31, 2024

(54) TONE RESERVATION TECHNIQUES FOR SIDELINK COMMUNICATIONS

(71) Applicant: QUALCOMM Incorporated, San Diego, CA (US)

(72) Inventors: Xiaojie Wang, Hillsborough, NJ (US); Xiaoxia Zhang, San Diego, CA (US); Junyi Li, Fairless Hills, PA (US)

(73) Assignee: QUALCOMM INCORPORATED, San Diego, CA (US)

( * ) Notice: Subject to any disclaimer, the term of this patent is extended or adjusted under 35 U.S.C. 154(b) by 338 days.

(21) Appl. No.: 17/682,192

(22) Filed: Feb. 28, 2022

(65) Prior Publication Data

US 2023/0276442 A1    Aug. 31, 2023

(51) Int. Cl.
*H04W 72/20* (2023.01)
*H04W 52/52* (2009.01)
*H04W 72/0453* (2023.01)

(52) U.S. Cl.
CPC .......... *H04W 72/20* (2023.01); *H04W 52/52* (2013.01); *H04W 72/0453* (2013.01)

(58) Field of Classification Search
CPC .. H04W 72/20; H04W 52/52; H04W 72/0453
See application file for complete search history.

(56) References Cited

U.S. PATENT DOCUMENTS

| 2022/0159678 A1* | 5/2022 | Back | H04W 72/20 |
| 2023/0171746 A1* | 6/2023 | Yang | H04L 27/26132 |
| | | | 370/330 |
| 2023/0327934 A1* | 10/2023 | El Hamss | H04W 52/146 |
| | | | 370/329 |

* cited by examiner

*Primary Examiner* — Michael A Keller
(74) *Attorney, Agent, or Firm* — Holland & Hart LLP

(57) ABSTRACT

Methods, systems, and devices for wireless communications are described. A wireless communications system may support tone reservation techniques in sidelink communications. A first user equipment (UE) may identify one or more subcarriers of a plurality of subcarriers, the one or more subcarriers associated with a tone reservation signal for sidelink. The first UE may select one or more symbols for transmitting the tone reservation signal on the one or more subcarriers. The first UE may transmit, to a second UE, sidelink signaling over the plurality of subcarriers, wherein the sidelink signaling includes the tone reservation signal over the one or more subcarriers during the one or more symbols. The second UE may receive the sidelink signaling and identify the tone reservation signal during the one or more symbols associated with the one or more subcarriers. The second UE may decode the sidelink signaling based on identifying the tone reservation signal.

30 Claims, 9 Drawing Sheets

TONE RESERVATION TECHNIQUES FOR SIDELINK COMMUNICATIONS

FIELD OF TECHNOLOGY

The following relates to wireless communications, including tone reservation techniques for sidelink communications.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

SUMMARY

The described techniques relate to improved methods, systems, devices, and apparatuses that support tone reservation for sidelink communications. Generally, the described techniques relate to transmitting a tone reservation signal during one or more selected symbols over one or more identified subcarriers of a set of multiple of subcarriers on a sidelink. For example, a first user equipment (UE) (e.g., a transmitting UE) may identify one or more subcarriers associated with a tone reservation signal for sidelink signaling and select one or more symbols for transmitting the tone reservation signal on the one or more subcarriers. Further, the first UE may transmit, to a second UE (e.g., a receiving UE), the sidelink signaling over the set of multiple subcarriers, including transmitting the tone reservation signal over the one or more subcarriers during the one or more symbols. The second UE may receive the sidelink signaling and identify the tone reservation signal during the one or more symbols associated with the one or more subcarriers. Additionally, the second UE may decode the sidelink signaling based on identifying the tone reservation signal.

In some cases, the first UE may select a symbol for automatic gain control (AGC) for transmitting the tone reservation signal. Additionally, or alternatively, the first UE may select the one or more symbols that at least partially overlap with a physical sidelink control channel (PSCCH), or a physical sidelink shared channel (PSSCH), or both, and may transmit the sidelink signaling including the tone reservation symbol during the one or more symbols that at least partially overlap with the PSCCH, or the PSSCH, or both. In some cases, the first UE may puncture one or more demodulation reference signals (DMRSs) on the one or more subcarriers with the tone reservation signal.

In some cases, the first UE may transmit an indication of the one or more subcarriers, the one or more symbols, or both, to the second UE via sidelink control information (SCI), a medium access control (MAC) control element (CE), radio resource control (RRC) signaling for examples on a PSSCH, other information or signaling, or any combination thereof. In some cases, the second UE may transmit a request for the tone reservation signal. In some cases, the request may indicate one or more subcarriers associated with the tone reservation signal.

A method for wireless communications at a first UE is described. The method may include identifying one or more subcarriers of a set of multiple subcarriers, the one or more subcarriers associated with a tone reservation signal for sidelink signaling, selecting one or more symbols for transmitting the tone reservation signal on the one or more subcarriers, and transmitting, to a second UE, the sidelink signaling over the set of multiple subcarriers on a sidelink, where the sidelink signaling includes the tone reservation signal over the one or more subcarriers during the one or more symbols.

An apparatus for wireless communications at a first UE is described. The apparatus may include a processor, memory coupled with the processor, and instructions stored in the memory. The instructions may be executable by the processor to cause the apparatus to identify one or more subcarriers of a set of multiple subcarriers, the one or more subcarriers associated with a tone reservation signal for sidelink signaling, select one or more symbols for transmitting the tone reservation signal on the one or more subcarriers, and transmit, to a second UE, the sidelink signaling over the set of multiple subcarriers on a sidelink, where the sidelink signaling includes the tone reservation signal over the one or more subcarriers during the one or more symbols.

Another apparatus for wireless communications at a first UE is described. The apparatus may include means for identifying one or more subcarriers of a set of multiple subcarriers, the one or more subcarriers associated with a tone reservation signal for sidelink signaling, means for selecting one or more symbols for transmitting the tone reservation signal on the one or more subcarriers, and means for transmitting, to a second UE, the sidelink signaling over the set of multiple subcarriers on a sidelink, where the sidelink signaling includes the tone reservation signal over the one or more subcarriers during the one or more symbols.

A non-transitory computer-readable medium storing code for wireless communications at a first UE is described. The code may include instructions executable by a processor to identify one or more subcarriers of a set of multiple subcarriers, the one or more subcarriers associated with a tone reservation signal for sidelink signaling, select one or more symbols for transmitting the tone reservation signal on the one or more subcarriers, and transmit, to a second UE, the sidelink signaling over the set of multiple subcarriers on a sidelink, where the sidelink signaling includes the tone reservation signal over the one or more subcarriers during the one or more symbols.

In some examples of the method, apparatuses, and non-transitory computer-readable medium described herein, selecting the one or more symbols may include operations, features, means, or instructions for selecting a symbol for automatic gain control, where transmitting the sidelink signaling includes and transmitting the sidelink signaling including the tone reservation signal over the one or more subcarriers during the symbol for automatic gain control.

In some examples of the method, apparatuses, and non-transitory computer-readable medium described herein, the one or more subcarriers including the tone reservation signal correspond to a physical sidelink shared channel, a physical sidelink control channel, or both.

In some examples of the method, apparatuses, and non-transitory computer-readable medium described herein, the one or more subcarriers correspond to one or more most significant subcarrier indexes of the set of multiple subcarriers associated with a physical sidelink shared channel, or a physical sidelink control channel, or both.

In some examples of the method, apparatuses, and non-transitory computer-readable medium described herein, selecting the one or more symbols may include operations, features, means, or instructions for selecting the one or more symbols that at least partially overlap with a physical sidelink control channel, where transmitting the sidelink signaling includes and transmitting the sidelink signaling including the tone reservation signal over the one or more subcarriers during the one or more symbols that at least partially overlap with the physical sidelink control channel.

Some examples of the method, apparatuses, and non-transitory computer-readable medium described herein may further include operations, features, means, or instructions for transmitting an indication of the one or more subcarriers, or the one or more symbols, or both, to the second UE via sidelink control information, a MAC CE, RRC signaling on a physical sidelink shared channel, or any combination thereof.

In some examples of the method, apparatuses, and non-transitory computer-readable medium described herein, identifying the one or more subcarriers may include operations, features, means, or instructions for receiving control signaling configuring the physical sidelink control channel, where the control signaling indicates positions for the one or more subcarriers, the one or more symbols, or both.

In some examples of the method, apparatuses, and non-transitory computer-readable medium described herein, the one or more subcarriers correspond to one or more most significant subcarrier indexes of the set of multiple subcarriers associated with a physical sidelink shared channel, or a physical sidelink control channel, or both.

Some examples of the method, apparatuses, and non-transitory computer-readable medium described herein may further include operations, features, means, or instructions for puncturing one or more demodulation reference signals on the one or more subcarriers with the tone reservation signal.

In some examples of the method, apparatuses, and non-transitory computer-readable medium described herein, selecting the one or more symbols may include operations, features, means, or instructions for selecting the one or more symbols that at least partially overlap with a physical sidelink shared channel, where transmitting the sidelink signaling includes and transmitting the sidelink signaling including the tone reservation signal over the one or more subcarriers during the one or more symbols that at least partially overlap with the physical sidelink shared channel.

In some examples of the method, apparatuses, and non-transitory computer-readable medium described herein, the one or more subcarriers of the physical sidelink shared channel during the one or more symbols may be associated with sidelink control information signaling.

Some examples of the method, apparatuses, and non-transitory computer-readable medium described herein may further include operations, features, means, or instructions for transmitting an indication of the one or more subcarriers, or the one or more symbols, or both, to the second UE via sidelink control information, a MAC CE, RRC signaling on a physical sidelink shared channel, or any combination thereof.

Some examples of the method, apparatuses, and non-transitory computer-readable medium described herein may further include operations, features, means, or instructions for receiving control signaling configuring the physical sidelink shared channel, where the control signaling indicates positions for the one or more subcarriers, the one or more symbols, or both.

Some examples of the method, apparatuses, and non-transitory computer-readable medium described herein may further include operations, features, means, or instructions for puncturing one or more demodulation reference signals on the one or more subcarriers with the tone reservation signal.

In some examples of the method, apparatuses, and non-transitory computer-readable medium described herein, transmitting the sidelink signaling may include operations, features, means, or instructions for transmitting the sidelink signaling puncturing one or more demodulation reference signals on the one or more subcarriers with the tone reservation signal during the one or more symbols.

Some examples of the method, apparatuses, and non-transitory computer-readable medium described herein may further include operations, features, means, or instructions for transmitting an indication of the one or more subcarriers or the one or more symbols, or both, to the second UE via sidelink control information, a MAC CE, RRC signaling on a physical sidelink shared channel, or any combination thereof.

In some examples of the method, apparatuses, and non-transitory computer-readable medium described herein, the one or more subcarriers including the tone reservation signal at least partially correspond to a physical sidelink shared channel, a physical sidelink control channel, or both.

In some examples of the method, apparatuses, and non-transitory computer-readable medium described herein, identifying the one or more subcarriers may include operations, features, means, or instructions for receiving an indication of the one or more subcarriers associated with the tone reservation signal.

Some examples of the method, apparatuses, and non-transitory computer-readable medium described herein may further include operations, features, means, or instructions for receiving, from the second UE, a request for the tone reservation signal.

In some examples of the method, apparatuses, and non-transitory computer-readable medium described herein, identifying the one or more subcarriers may include operations, features, means, or instructions for receiving the request from the second UE including an indication of the one or more subcarriers associated with the tone reservation signal.

A method for wireless communications at a second UE is described. The method may include receiving, from a first UE, sidelink signaling over a set of multiple subcarriers on a sidelink connection, identifying a tone reservation signal during one or more symbols associated with one or more subcarriers, and decoding the sidelink signaling based on identifying the tone reservation signal.

An apparatus for wireless communications at a second UE is described. The apparatus may include a processor, memory coupled with the processor, and instructions stored in the memory. The instructions may be executable by the processor to cause the apparatus to receive, from a first UE, sidelink signaling over a set of multiple subcarriers on a sidelink connection, identify a tone reservation signal during one or more symbols associated with one or more subcarriers, and decode the sidelink signaling based on identifying the tone reservation signal.

Another apparatus for wireless communications at a second UE is described. The apparatus may include means for receiving, from a first UE, sidelink signaling over a set of multiple subcarriers on a sidelink connection, means for identifying a tone reservation signal during one or more symbols associated with one or more subcarriers, and means for decoding the sidelink signaling based on identifying the tone reservation signal.

A non-transitory computer-readable medium storing code for wireless communications at a second UE is described. The code may include instructions executable by a processor to receive, from a first UE, sidelink signaling over a set of multiple subcarriers on a sidelink connection, identify a tone reservation signal during one or more symbols associated with one or more subcarriers, and decode the sidelink signaling based on identifying the tone reservation signal.

In some examples of the method, apparatuses, and non-transitory computer-readable medium described herein, receiving the sidelink signaling may include operations, features, means, or instructions for receiving the sidelink signaling including the tone reservation signal during a symbol for automatic gain control.

In some examples of the method, apparatuses, and non-transitory computer-readable medium described herein, receiving the sidelink signaling may include operations, features, means, or instructions for receiving the sidelink signaling including the tone reservation signal over the one or more subcarriers during the one or more symbols that at least partially overlap with a physical sidelink control channel, a physical sidelink shared channel, or both.

In some examples of the method, apparatuses, and non-transitory computer-readable medium described herein, receiving the sidelink signaling may include operations, features, means, or instructions for receiving the sidelink signaling puncturing one or more demodulation reference signals on the one or more subcarriers with the tone reservation signal during the one or more symbols.

Some examples of the method, apparatuses, and non-transitory computer-readable medium described herein may further include operations, features, means, or instructions for receiving an indication of the one or more subcarriers or the one or more symbols, or both, from the first UE via sidelink control information, a MAC CE, RRC signaling on a physical sidelink shared channel, or any combination thereof.

In some examples of the method, apparatuses, and non-transitory computer-readable medium described herein, identifying the one or more subcarriers may include operations, features, means, or instructions for receiving an indication of the one or more subcarriers associated with the tone reservation signal.

Some examples of the method, apparatuses, and non-transitory computer-readable medium described herein may further include operations, features, means, or instructions for transmitting, to the first UE, a request for the tone reservation signal.

In some examples of the method, apparatuses, and non-transitory computer-readable medium described herein, identifying the one or more subcarriers may include operations, features, means, or instructions for transmitting the request to the first UE including an indication of the one or more subcarriers associated with the tone reservation signal.

DETAILED DESCRIPTION

Figure 1:
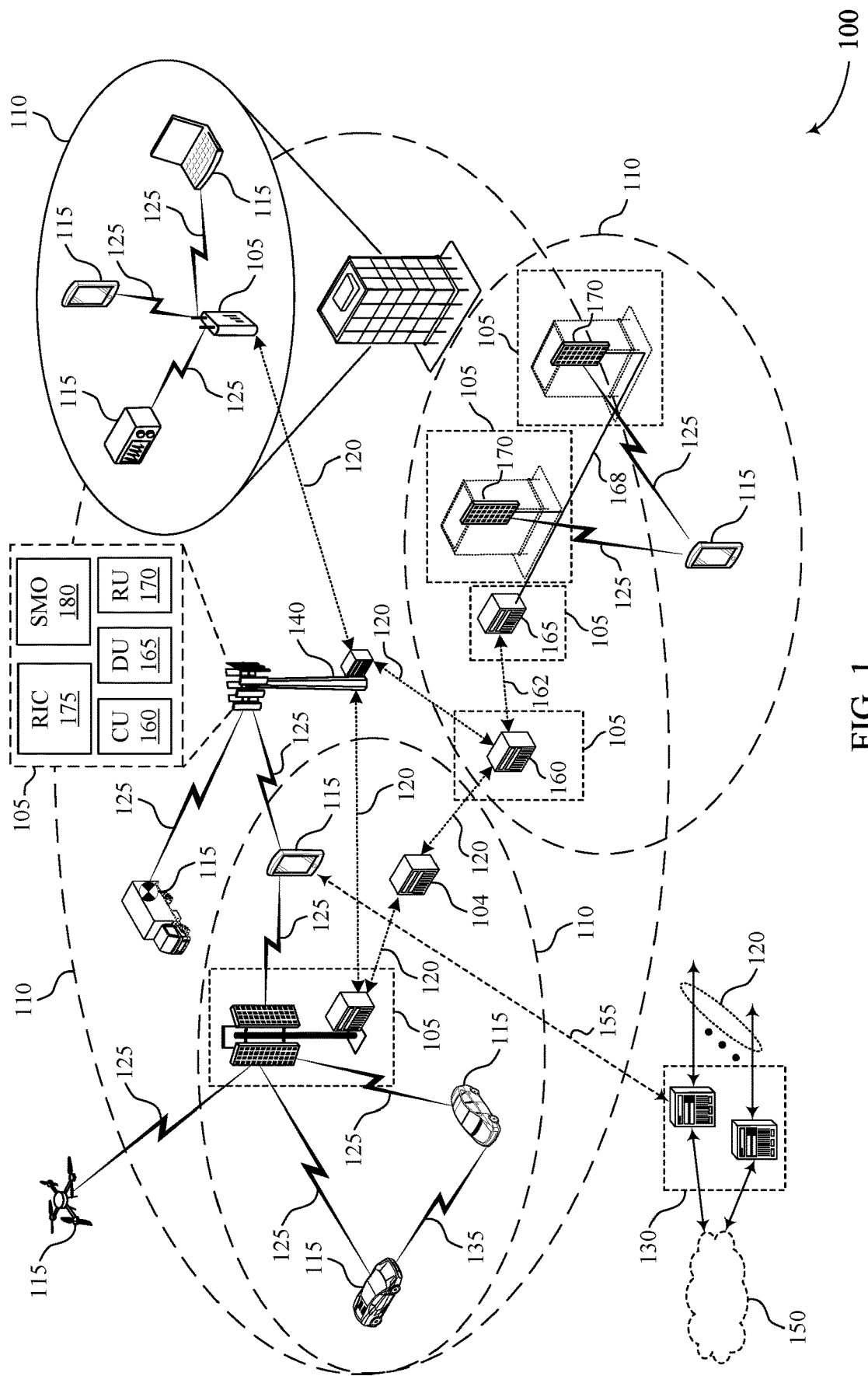
FIG. 1 illustrates an example of a wireless communications system that supports tone reservation techniques for sidelink communications in accordance with one or more aspects of the present disclosure.

Some wireless communications systems (e.g., a 5G system) may support use of an OFDM waveform, such as in sidelink communications. In some cases, the OFDM waveform may exhibit high peak-to-average-power ratio (PAPR) based on the superposition of different signals in one or more subcarriers. That is, a first user equipment (UE) may modulate each signal in the subcarriers to produce symbols, such as quadrature amplitude modulation (QAM) symbols, which the first UE may linearly combine during operations, such as inverse Fast Fourier Transform (IFFT) operations. As such, some output OFDM symbols may have high PAPR. In some cases, the high PAPR at the first UE (e.g., a transmitting UE) may cause a power amplifier at the first UE to operate in a non-linear region, which may result in signal distortions such as out of line emission, distorted signal to interference ratio, and other signaling effects that impact the reliability of transmissions in the system. In some other cases, high PAPR at the first UE may trigger a power backoff at the power amplifier of the first UE, which may reduce the total transmit power resulting in decreased signal performance. Additionally, using the lower transmit power may result in decreased performance and decoding at a power amplifier at a second UE (e.g., a receiving UE).

Techniques described herein may support tone reservation techniques for sidelink communications. For example, a first UE, which may be referred to as a transmitting UE, may apply (e.g., transmit) a tone reservation signal for sidelink signaling to reduce the PAPR of the sidelink signaling. That is, the transmitting UE may identify one or more subcarriers to apply the tone reservation signal during one or more selected symbols for sidelink signaling to cancel out time domain peaks generated by other subcarriers, such as data subcarriers, resulting in a lower PAPR with fewer transmit power peaks. In some cases, the transmitting UE may apply the tone reservation signal during a symbol for automatic gain control (AGC). In some other cases, the transmitting UE may apply the tone reservation signal to sidelink symbols carrying a sidelink shared channel (e.g., a physical sidelink shared channel (PSSCH)), a sidelink control channel (e.g., a physical sidelink control channel (PSCCH)), or both. Additionally, or alternatively, the transmitting UE may puncture demodulation reference signals (DMRSs) with the tone reservation signal. A second UE, which may be referred to as a receiving UE, may identify the tone reservation signal during the one or more symbols associated with the one or more subcarriers and decode the sidelink signaling based on identifying the tone reservation signal.

In some cases, the one or more subcarriers may be selected by the transmitting UE, be configured by a network entity, or be preconfigured. In some examples, the transmitting UE may indicate the one or more subcarriers, one or more symbols, or both, to the receiving UE. Additionally, or alternatively, the receiving UE may request for the transmitting UE to apply tone reservation, and the receiving UE may indicate the one or more subcarriers in the request.

Aspects of the disclosure are initially described in the context of wireless communications systems. Aspects of the disclosure are then described in the context of a process flow. Aspects of the disclosure are further illustrated by and described with reference to apparatus diagrams, system diagrams, and flowcharts that relate to tone reservation techniques for sidelink communications.

FIG. 1 illustrates an example of a wireless communications system 100 that supports tone reservation techniques for sidelink communications in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another over a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 through a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending upon which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication over such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

In the case of the techniques described herein applied in the context of a disaggregated RAN architecture, one or more components of the disaggregated RAN architecture may be configured to support tone reservation techniques for sidelink communications as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) over one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

In some examples, such as in a carrier aggregation configuration, a carrier may also have acquisition signaling or control signaling that coordinates operations for other carriers. A carrier may be associated with a frequency channel (e.g., an evolved universal mobile telecommunication system terrestrial radio access (E-UTRA) absolute RF channel number (EARFCN)) and may be positioned according to a channel raster for discovery by the UEs 115. A carrier may be operated in a standalone mode, in which case initial acquisition and connection may be conducted by the UEs 115 via the carrier, or the carrier may be operated in a non-standalone mode, in which case a connection is anchored using a different carrier (e.g., of the same or a different radio access technology).

The communication links 125 shown in the wireless communications system 100 may include downlink transmissions (e.g., forward link transmissions) from a network entity 105 to a UE 115, uplink transmissions (e.g., return link transmissions) from a UE 115 to a network entity 105, or both, among other configurations of transmissions. Carriers may carry downlink or uplink communications (e.g., in an FDD mode) or may be configured to carry downlink and uplink communications (e.g., in a TDD mode).

A carrier may be associated with a particular bandwidth of the RF spectrum and, in some examples, the carrier bandwidth may be referred to as a "system bandwidth" of the carrier or the wireless communications system 100. For example, the carrier bandwidth may be one of a set of bandwidths for carriers of a particular radio access technology (e.g., 1.4, 3, 5, 10, 15, 20, 40, or 80 megahertz (MHz)). Devices of the wireless communications system 100 (e.g., the network entities 105, the UEs 115, or both) may have hardware configurations that support communications over a particular carrier bandwidth or may be configurable to support communications over one of a set of carrier bandwidths. In some examples, the wireless communications system 100 may include network entities 105 or UEs 115 that support concurrent communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both) such that the more resource elements that a device receives and the higher the order of the modulation scheme, the higher the data rate may be for the device. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the network entities 105 or the UEs 115 may be expressed in multiples of a basic time unit which may, for example, refer to a sampling period of $T_s=1/(\Delta f_{max} \cdot N_f)$ seconds, where $\Delta f_{max}$, may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a network entity 105 (e.g., a base station 140) without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception concurrently). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be able to communicate directly with other UEs 115 over a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by or scheduled by the network entity 105. In some examples, one or more UEs 115 in such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without the involvement of a network entity 105.

In some systems, a D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., network entities 105, base stations 140, RUs 170) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, which may be referred to as clusters, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. While operating in unlicensed RF spectrum bands, devices such as the network entities 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located in diverse geographic locations. A network entity 105 may have an antenna array with a set of rows and columns of antenna ports that the network entity 105 may use to support beamforming of communications with a UE 115. Likewise, a UE 115 may have one or more antenna arrays that may support various MIMO or beamforming operations. Additionally, or alternatively, an antenna panel may support RF beamforming for a signal transmitted via an antenna port.

The network entities 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry information associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The wireless communications system 100 may be a packet-based network that operates according to a layered protocol stack. In the user plane, communications at the bearer or PDCP layer may be IP-based. An RLC layer may perform packet segmentation and reassembly to communicate over logical channels. A MAC layer may perform priority handling and multiplexing of logical channels into transport channels. The MAC layer may also use error detection techniques, error correction techniques, or both to support retransmissions at the MAC layer to improve link efficiency. In the control plane, the RRC protocol layer may provide establishment, configuration, and maintenance of an RRC connection between a UE 115 and a network entity 105 or a core network 130 supporting radio bearers for user plane data. At the PHY layer, transport channels may be mapped to physical channels.

The wireless communications system 100 may support tone reservation techniques for sidelink communications. For example, a first UE 115, which may be referred to as a transmitting UE 115, may apply a tone reservation signal to one or more subcarriers in sidelink signaling to cancel out time domain peaks generated by other subcarriers. That is, the first UE 115 may transmit a tone reservation signal in one or more symbols of the one or more subcarriers in the sidelink signaling to reduce a peak-to-average-power ratio of the sidelink signaling. In some cases, the first UE 115 may transmit the one or more tone reservation signals during a symbol for AGC. In some other cases, the first UE 115 may transmit the tone reservation during one or more sidelink symbols carrying a PSSCH, a PSCCH, or both. In some other cases, the first UE 115 may puncture DMRSs with the tone reservation signal.

The first UE 115 may transmit the sidelink signaling including the tone reservation signal over the one or more subcarriers. A second UE 115, which may be referred to as a receiving UE 115, may receive the sidelink signal including the tone reservation signal and may identify the tone reservation signal. The second UE 115 may decode the sidelink signaling based on identifying the tone reservation, which may result in improving the PAPR of the sidelink signaling.

In some cases, the first UE 115 may select the one or more subcarriers, the one or more symbols, or both, to have the tone reservation signal applied. In some other cases, the one or more subcarriers, the one or more symbols, or both, may be configured by a network entity or be preconfigured. The first UE 115 may indicate the one or more subcarriers, one or more symbols, or both to the second UE 115. Additionally, or alternatively, the second UE 115 may request for the first UE 115 to apply tone reservation, and the second UE 115 may indicate the one or more subcarriers in the request.

Figure 2:
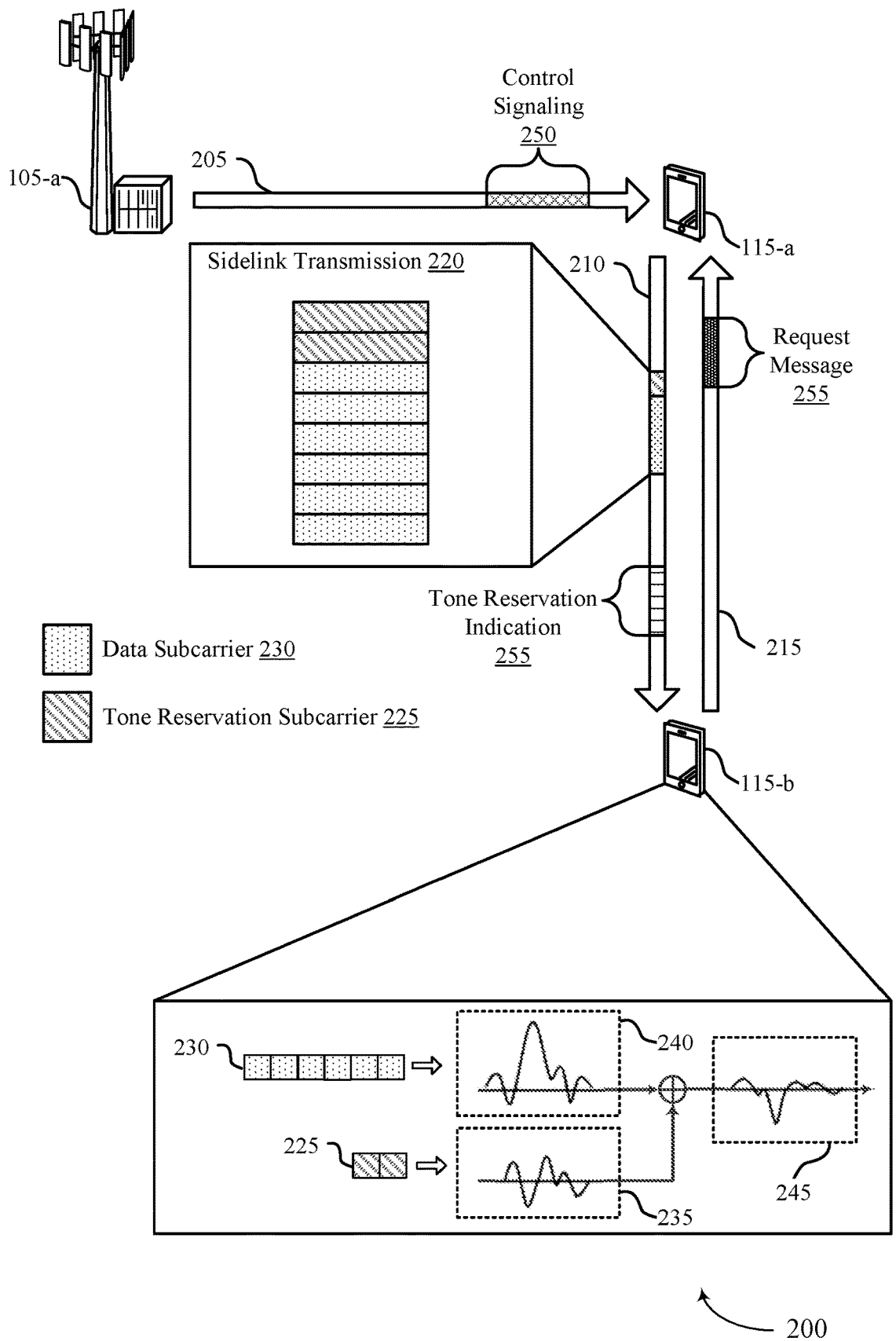
FIG. 2 illustrates an example of a wireless communications system that supports tone reservation techniques for sidelink communications in accordance with one or more aspects of the present disclosure.

FIG. 2 illustrates an example of a wireless communications system 200 that supports tone reservation techniques for sidelink communications in accordance with one or more aspects of the present disclosure. The wireless communications system 200 may implement or be implemented by aspects of the wireless communications system 100. For example, the wireless communications system 200 may include a network entity 105-*a*, a UE 115-*a*, and a UE 115-*b*. The UE 115-*a* and the UE 115-*b* may represent example of UEs 115 as described herein, including with reference to FIG. 1. The network entity 105-*a* may represent an example of a network entity 105 as described herein, including with reference to FIG. 1.

The wireless communications system 200 may support communications between the UE 115-*a* and the network entity 105-*a*. For example, the UE 115- may receive downlink messages over a communication link 205 (which may be an example of a communication link 125).

The wireless communications system 200 may also support sidelink communications between the UE 115-*a* and the UE 115-*b*. For example, the UE 115-*a* may transmit sidelink transmission 220 including a tone reservation signal 235 to the UE 115-*b* over a communication link 210 (which may be an example of a communication link 135) and may receive a request message 255 from the UE 115-*b* over a communication link 215 (which may be an example of a communication link 135).

In some cases, the network entity 105-*a* may configure resources for sidelink communications between the UE 115-*a* and the UE 115-*b* (e.g., Mode 1 communications). For example, the network entity 105-*a* may transmit control signaling 250 to the UE 115-*a* indicating resources (e.g., time and frequency resources) for a sidelink transmission 220 (e.g., via DCI 3_0). In such cases, the UE 115-*a* may select a modulation and coding scheme (MCS) within a limit indicated by the network entity 105-*a*. In some other cases, the UE 115-*a* may determine the resources for sidelink communications between the UE 115-*a* and the UE 115-*b*. For example, the UE 115-*a* may perform channel sensing via blind decoding of sidelink control channels (e.g., PSCCH) to determine resources reserved by sidelink transmissions by other UEs 115.

The wireless communications system 200 may also support use of an OFDM waveform, specifically in the sidelink communications. In some cases, an OFDM waveform may exhibit high PAPR (e.g., PAPR above a threshold level) based on the superposition of different signals in subcarriers. That is, a UE 115-*a* may modulate each signal in the subcarriers to produce QAM symbols which the UE 115-*a* may linearly combine during IFFT operations. As such, some output OFDM symbols may have high PAPR.

In some cases, high PAPR at a transmitting UE 115, such as the UE 115-*a*, may cause a power amplifier at the UE 115-*a* to operate in a non-linear region. That is, the UE 115-*a* may pass a signal through the power amplifier to amplify the signal without degradation of the signal-to-noise ratio (SNR). In some cases, the power level of the signal may exceed the range of the power amplifier due to the high PAPR, producing a non-linear response. The non-linear power amplified signal may have a signal power that varies with time such that the peak power value of a sample in a given OFDM transmit symbol for the signal is greater than the average power value of the signal. In cases in which PAPR satisfies a threshold level, the UE 115-*a* may "clip" the peak (e.g., the device may measure an incorrect value or partial value of the peak), causing signal distortions such as out of line emission, distorted signal to interference ratio, and other signaling effects that impact the reliability of transmissions in the system. In some other cases, high PAPR at the UE 115-*a* may trigger a power backoff at the power amplifier at the UE 115-*a*, which may reduce the total transmit power. That is, the UE 115-*a* may reduce the power level of a signal below the saturation point to allow the power amplifier to continue to operate in a linear region. However, reducing the total transmit power may result in decreased signal performance.

Additionally, high PAPR may affect the performance of a power amplifier at a receiving UE 115, such as a UE 115-*b*, as well as the decoding ability of the UE 115-*b*. For example, the UE 115-*a* may pass a received signal through the power amplifier to amplify the received signal. However, the power level of the received signal may exceed the range of the amplifier due to the high PAPR, producing a non-linear response. When a non-linear response occurs the UE 115-*b* may be unable to predict signal response and reduce noise for further processing which may result in saturation. When saturation occurs, the UE 115-*b* may be unable to process the signal (e.g., due to a non-linear response), which may cause latency related to transmission.

Techniques described herein may support tone reservation techniques for sidelink communications in the wireless communications system 200. In some cases, the UE 115-*a* may identify a number of subcarriers out of a set of subcarriers for a sidelink transmission 220 that may be used to transmit a tone reservation signal 235 (e.g., a peak-cancelling signal) that may lower the PAPR of a data signal 240. For example, the UE 115-*a* may identify one or more tone reservation subcarriers 225 in the sidelink transmission 220 to transmit the tone reservation signal 235. That is, the UE 115-*a* may select one or more symbols on the one or more tone reservation subcarriers 225 to transmit the tone reservation signal 235. In some cases, the one or more tone reservation subcarriers 225 may correspond to a PSSCH, a PSCCH, or both. The UE 115-*a* may use the remaining subcarriers, or data subcarriers 230, to transmit the data signal 240. The transmission of both the tone reservation signal 235 and the data signal 240 on different subcarriers (e.g., OFDM tones) may reduce the peak signal (e.g., reduce the peaks in the data signal 240) such that the UE 115-*b* may receive the sidelink transmission 220 as signal 245 with reduced PAPR which may lead to increased system performance.

In some cases, the UE 115-*a* may select one or more symbols, such as an AGC symbol, to apply the tone reservation signal 235. That is, the UE 115-*a* may apply tone reservation signal 235 to an AGC symbol in a tone reservation subcarrier 225. In some cases, the first symbol of the sidelink transmission 220 may be dedicated to AGC calibration so that the UE 115-*b* may estimate the arriving signal power and adjust hardware of the UE 115-*b* to receive the sidelink transmission 220. As such, applying the tone reservation signal 235 to the AGC symbol may decrease the PAPR resulting in decreased AGC calibration time and more accurate AGC setting, compared to high PAPR resulting in longer AGC calibration time or less accurate AGC setting. Further, the AGC symbol may be overhead in the sidelink transmission 220 and, therefore, applying the tone reservation signal 235 to the AGC symbol may not increase the overhead of the sidelink transmission 220. In some cases, the AGC symbol may be a duplicate of the second symbol of the sidelink transmission 220, while in other cases the AGC symbol may not carry information or may carry unique information (e.g., information other than repeated information from another symbol).

In some cases, the UE 115-*a* may select the AGC symbol from any quantity of tone reservation subcarriers 225 at any position within the sidelink transmission 220. Additionally, the UE 115-*a* may transmit the first symbol of the of the tone reservation signal 235 using the same power as the rest of the symbols (e.g., PSSCH or PSCCH symbols after the AGC symbol). In some cases, a maximum quantity of tone reservation subcarriers 225 may be configured by the network entity 105-*a* or may be preconfigured.

In some cases, the UE 115-*a* may select tone reservation subcarriers 225 that are associated with PSSCH (e.g., but not PSCCH) during the AGC symbol. That is, the tone reservation subcarriers 225 may occupy subcarrier positions belonging to PSSCH in a second symbol (e.g., to cancel out peaks generated by PSCCH). In some other cases, the UE 115-*a* may select tone reservation subcarriers 225 that belong to PSCCH (e.g., but not PSSCH) during the AGC symbol. That is, the tone reservation subcarriers 225 may occupy subcarrier positions belonging to PSCCH in a second symbol (e.g., to cancel out peaks generated by PSSCH).

In some cases, the quantity of tone reservation subcarriers 225 (e.g., belonging to PSSCH or PSCCH) may be preconfigured. Additionally, or alternatively, the quantity of tone reservation subcarriers 225 may be a pre-configured percentage. That is, the UE 115-*a* may be preconfigured to select a quantity of tone reservations subcarriers 225 that corresponds to a percentage of PSSCH subcarriers out of the total quantity of PSSCH subcarriers in the sidelink transmission 220 or corresponds to a percentage of PSCCH subcarriers out of the total quantity of PSCCH subcarriers in the sidelink transmission 220. In some cases, the position of the tone reservation subcarriers 225 may correspond to PSSCH subcarrier indexes with the largest indexes, and the lowest subcarrier indexes may correspond to PSCCH subcarriers. In some other cases, the position of the tone reservation subcarriers 225 may correspond to PSCCH subcarrier indexes with the largest indexes, and the lowest subcarrier indexes may correspond to PSSCH subcarriers. In some cases, the UE 115-*a* may select the AGC symbol from a preconfigured quantity of tone reservation subcarriers 225 in preconfigured positions for PSCCH and PSSCH. For example, the UE 115-*a* may be configured with a number of subcarriers for the tone reservation subcarriers 225 and positions (e.g., subcarrier indexes) for the tone reservation subcarriers 225.

Additionally, or alternatively, the UE 115-*a* may select a sidelink symbol carrying PSCCH to apply the tone reservation signal 235. That is, the one or more tone reservation subcarriers 225 may be one or more PSCCH subcarriers and the UE 115-*a* may apply the tone reservation signal 235 to one or more sidelink symbols carrying PSCCH (e.g., 2 or 3 starting symbols from the second symbol in the sidelink slot) in the tone reservation subcarriers 225 (e.g., PSCCH subcarriers). In some cases, the tone reservation signal 235 may increase the overhead of the sidelink transmission 220 due to puncturing subcarriers carrying data or reference signal transmission. As such, the quantity of tone reservation subcarriers 225 may be small (e.g., 2-5 subcarriers). Applying the tone reservation signal 235 to sidelink symbols carrying PSCCH will improve decoding probability of PSCCH.

In some cases, the UE 115-*a* may select a quantity of tone reservation subcarriers 225 and the position of the tone reservation subcarriers 225. In such cases, the UE 115-*a* may indicate the positions of the tone reservation subcarriers 225 to the UE 115-*b* (e.g., using SCI-2, MAC-CE, or RRC). In some other cases, the UE 115-*b* may use one or more tone reservation subcarriers 225 with pre-configured positions (e.g., configured via an RRC-IE of PSCCH configuration signaling). In some cases, the position of the tone reservation subcarriers 225 may belong to PSSCH or PSCCH. That is, the UE 115-*a* may position the tone reservation subcarriers 225 in positions associated with PSSCH or PSCCH subcarriers.

In some examples, the UE 115-*a* may select the position of the tone reservation subcarriers 225 such that the positions correspond to the location of DMRSs. That is, the UE 115-*a* may puncture the DMRS with the tone reservation signal 235 in the tone reservation subcarriers 225. In some cases, the DMRS may be DMRS of PSCCH or PSSCH. In some other cases, the position of the tone reservation subcarriers 225 may belong to DMRS of PSSCH or PSCCH. That is, the UE 115-*a* may position the tone reservation subcarriers 225 in positions associated with PSSCH or PSCCH subcarriers containing DMRS.

Additionally, or alternatively, the UE 115-*a* may select a sidelink symbol carrying PSSCH to apply the tone reservation signal 235. That is, the one or more tone reservation subcarriers 225 may be one or more PSSCH subcarriers and the UE 115-*a* may apply the tone reservation signal 235 to one or more sidelink symbols carrying PSSCH in the tone reservation subcarriers 225 (e.g., to protect the PSSCH).

In some cases, the UE 115-*a* may select the one or more sidelink symbols from sidelink symbols carrying PSSCH including SCI (e.g., SCI-2). In some other cases, the UE 115-*a* may select the sidelink symbols from sidelink symbols carrying PSSCH excluding SCI (e.g., the SCI-2 may not benefit from tone reservation). In both cases, the position of the tone reservation signal 235 may be similar to the position as applied when the tone reservation subcarriers correspond to PSCCH subcarriers. For example, the tone reservation signal 235 during the one or more symbols carrying PSSCH may be indicated to the receiving UE 115-*b*, preconfigured (e.g., by the network entity 105-*a* or within the wireless communications system 200), puncture DMRS, correspond to PSSCH subcarriers or PSCCH subcarriers, or any combination thereof.

In some cases, the UE 115-*a* may select a sidelink symbol carrying DMRS to apply the tone reservation signal 235. For example, the sidelink transmission 220 may support multiple DMRS symbols (e.g., 2, 3, or 4 DMRS symbols indicated in SCI-1). In some cases, the UE 115-*a* may be configured to apply the tone reservation signal 235 to the DMRS symbols (e.g., protect the DMRS symbols) to support accurate channel estimation. As such, the UE 115-*a* may insert the tone reservation subcarriers 225 where tone reservation positions may puncture one or more DMRS subcarriers (e.g., or use other subcarriers belonging to PSSCH or PSCCH). In some cases, the UE 115-*a* may indicate the position of the tone reservation signal 235 to the UE 115-*b* (e.g., via SCI or MAC-CE).

In some cases, the UE 115-*a* may be configured to apply, or insert, the tone reservation signal 235. For example, the UE 115-*a* may receive an indication of a configuration associated with the tone reservation signal 235 from the network entity 105-*a* in control signaling 250, such as for Mode 1 sidelink signaling. For example, the control signaling 250 may allocate sidelink resources to the UE 115-*a* for the sidelink transmission 220. Additionally, the control signaling 250 may indicate parameters associated with tone reservation operations. For example, the control signaling 250 may include an indication enabling or disabling tone reservation operations at the UE 115-*a* (e.g., while allowing the UE 115-*a* to select the one or more tone reservation subcarriers 225, one or more symbols for transmission of the tone reservation signal 235, and position of the one or more symbols). Additionally or alternatively, the control signaling 250 may include an indication of one or more symbols to be used for transmission of the tone reservation signal 235 (e.g., while allowing the UE 115-*a* to select the one or more tone reservation subcarriers 225 and position of the one or more symbols). Additionally or alternatively, the control signaling 250 may include an indication of the one or more tone reservation subcarriers 225, as well as the position of the one or more symbols to be used for transmission of the tone reservation signal 235.

In some other examples, such as for Mode 2 sidelink signaling, the UE 115-*a* may select the one or more tone reservation subcarriers 225, one or more symbols for transmission of the tone reservation signal 235, and position of the one or more symbols. For example, the UE 115-*a* may enable tone reservation operations based on a PAPR of the sidelink transmission 220 to be transmitted by the UE 115-*a* (e.g., the PAPR may exceed a threshold). In some other examples, the UE 115-*a* may enable tone reservation operations based on a sidelink resource pool configuration. In some cases, the UE 115-*b* may transmit a request message 255 to the UE 115-*a*, requesting the tone reservation signal 235 (e.g., requesting tone reservation operations be enabled). In some cases, the request message 255 may include an indication of the one or more tone reservation subcarriers 225 associated with the tone reservation signal 235.

Applying the tone reservation signal 235 to sidelink symbols improves the PAPR property of the sidelink transmission 220 which will result in more accurate AGC calibration. In some cases, AGC calibration may support low probability of error between estimated signal power and true signal power. As such, the estimation error may be smaller if arriving signals are of lower PAPR, as with tone reservation application, if the AGC training time is kept the same. AGC calibration performance may be important for sidelink since the sidelink transmissions may be uncoordinated and the interference may vary rapidly from slot to slot.

Applying the tone reservation signal 235 to sidelink transmission 220 will result in improved sidelink performance. With reduced PAPR, such as due to tone reservation application, a transmitter at the UE 115-*a* may use the linear region of a power amplifier at the UE 115-*a* and transmit the signal with lower distortion. A receiver at the UE 115-*b* may use a power amplifier at the UE 115-*b* to amplify the received signal with lower PAPR for improved decoding. As such, the SNR of the received signal will be higher at the receiver which will improve sidelink performance.

Applying the tone reservation signal 235 to sidelink transmission 220 will result in improved channel estimation. Sidelink signaling (e.g., C-V2X) may support high mobility scenarios and, as such, reducing PAPR for symbols carrying DMRS will result in more accurate channel estimation which will result in improves sidelink system performance.

Though described in the context of multiple embodiments, it is understood that the wireless communications system 200 may support any combination of the techniques disclosed herein. For example, the UE 115-*a* may select a symbol associated with more than one of an AGC symbol, PSSCH, PSCCH, or DM-RS. In such cases, the UE 115-*a* may apply the tone reservation signal 235 to protect the symbol shared by one or more sidelink channels or signals. For example, the UE 115-*a* may apply the tone reservation signal 235 to cancel out peaks generated by the superposition of PSCCH and PSSCH.

Figure 3:
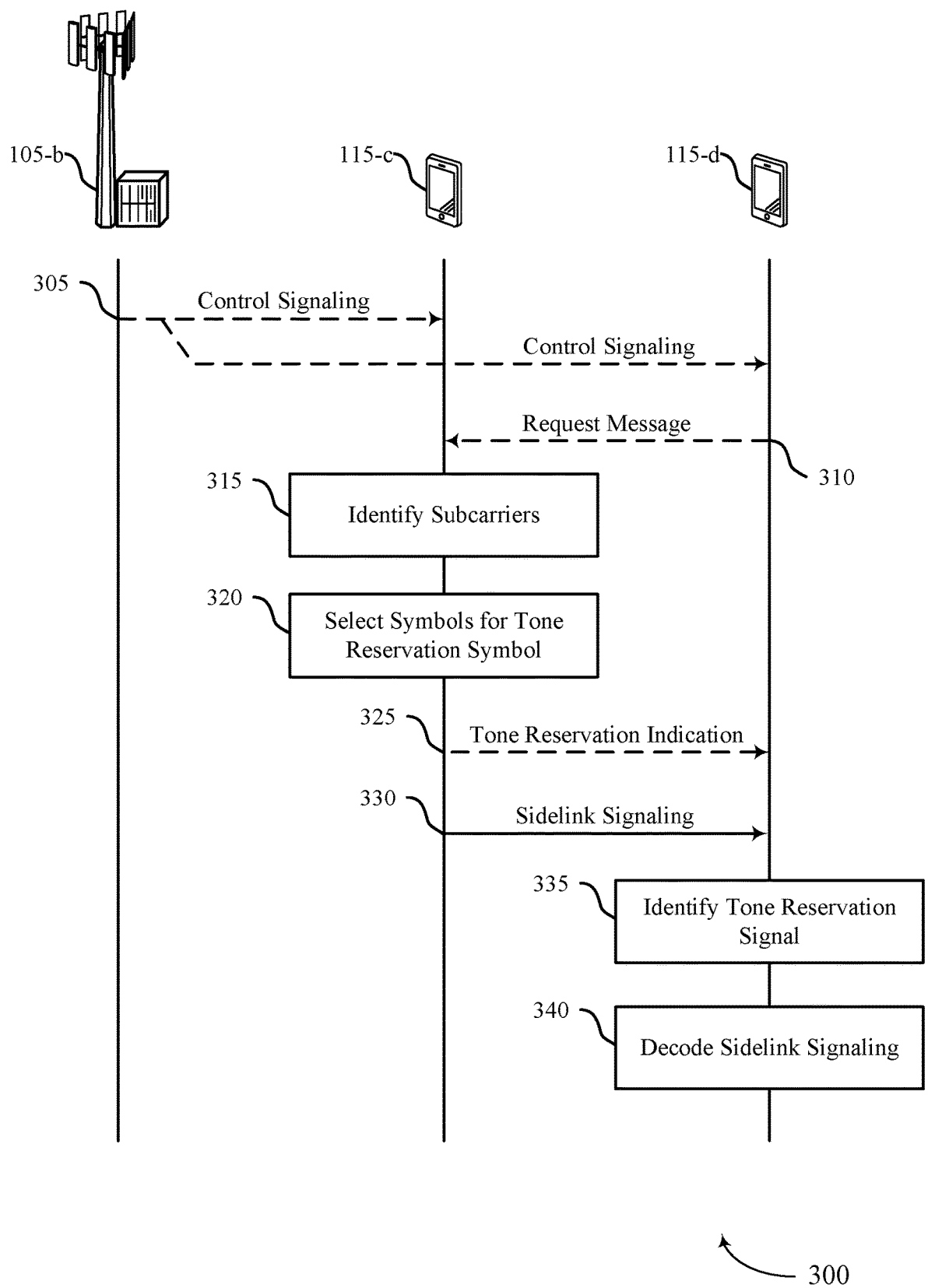
FIG. 3 illustrates an example of a process flow that supports tone reservation techniques for sidelink communications in accordance with one or more aspects of the present disclosure.

FIG. 3 illustrates an example of a process flow 300 that supports tone reservation techniques for sidelink communications in accordance with one or more aspects of the present disclosure. The process flow 300 may implement or be implemented by aspects of the wireless communications system 100 and the wireless communications system 200. For example, the process flow 300 may include a network entity 105-*b*, a UE 115-*c*, and a UE 115-*d*. The UE 115-*c* and the UE 115-*d* may represent example of UEs 115 as described herein, including with reference to FIG. 1. The network entity 105-*b* may represent an example of a network entity 105 as described herein, including with reference to FIG. 1. For example, the UE 115-*c* and the UE 115-*d* may receive control signaling from the network entity 105-*b* indicating positions for one or more subcarriers, one or more symbols, or both, for applying tone reservation signaling.

In some cases, at 305, a network entity 105-*b* may transmit control signaling to a UE 115-*c* and a UE 115-*d*. The control signaling may indicate positions for one or more subcarriers associated with a tone reservation signal, one or more symbols for applying the tone reservation signal, or both. In some examples, the control signaling may be PSCCH configuration signaling, which may configure a PSCCH resource pool for the UE 115-*a* or the UE 115-*b*, or both.

In some cases, at 310, the UE 115-*d* may transmit a request message to the UE 115-*c* requesting the tone reservation signal. In some cases, the request message may include an indication of the one or more subcarriers associated with the tone reservation signal.

At 315, the UE 115-*c* may identify one or more subcarriers of a plurality of subcarriers, the one or more subcarriers being associated with a tone reservation signal for sidelink signaling. In some cases, the one or more subcarriers including the tone reservation signal may correspond to a PSSCH, a PSCCH, or both. In some cases, the one or more subcarriers may correspond to one or more most significant subcarrier indexes of the plurality of subcarriers associated with the PSSCH, the PSCCH, or both.

At 320, the UE 115-c may select one or more symbols for transmitting the tone reservation signal on the one or more subcarriers. In some cases, the UE 115-a may select a symbol for AGC. In some cases, the one or more symbols may at least partially overlap with a PSCCH or a PSSCH. In some cases, the one or more subcarriers of the PSSCH may be associated with SCI signaling. In some cases, the UE 115-c may puncture one or more DMRSs on the one or more subcarriers with the tone reservation signal.

In some cases, at 325, the UE 115-c may indicate the one or more subcarriers or the one or more symbols, or both the one or more subcarriers and the one or more symbols, to the UE 115-d. For example, the UE 115-c may transmit, to the UE 115-d, an indication of the one or more subcarriers, the one or more symbols, or both, via SCI, MAC-CE, RRC signaling on a PSSCH, or any combination thereof.

At 330, the UE 115-c may transmit the sidelink signaling over the plurality of subcarriers on a sidelink, wherein the sidelink signaling includes the tone reservation signal over the one or more subcarriers during the one or more symbols. In some cases, the UE 115-c may transmit the sidelink signaling during the symbol for AGC. In some cases, the UE 115-c may transmit the sidelink signaling during the one or more symbols that at least partially overlap with the PSCCH or the PSSCH. In some cases, the UE 115-c may transmit the sidelink signaling puncturing the one or more DMRSs on the one or more subcarriers with the tone reservation signal during the one or more signals.

At 330, the UE 115-d may receive the sidelink signaling including the tone reservation signal. For example, the UE 115-d may receive the sidelink signaling including the tone reservation signal during the symbol for AGC, during one or more symbols overlapping PSCCH, during one or more symbols overlapping PSSCH, or any combination thereof. In some cases, the UE 115-d may receive the sidelink signaling puncturing the one or more DMRSs on the one or more subcarriers with the tone reservation signal during the one or more symbols At 335, the UE 115-d may identify the tone reservation signal during the one or more symbols associated with the one or more subcarriers and, at 340, the UE 115-d may decode the sidelink signaling based on identifying the tone reservation signal.

Figure 4:
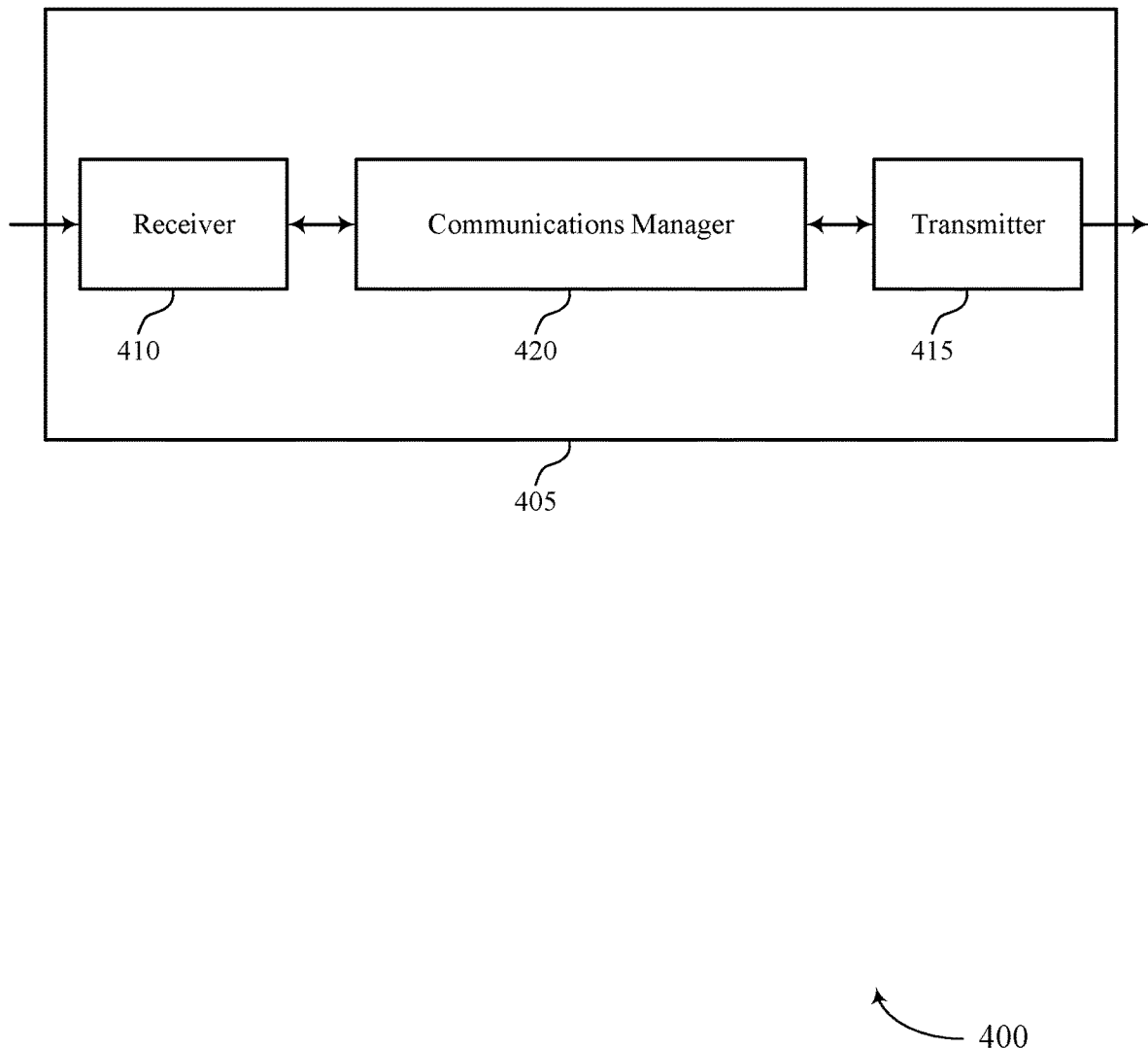
FIGS. 4 and 5 show block diagrams of devices that support tone reservation techniques for sidelink communications in accordance with one or more aspects of the present disclosure.

FIG. 4 shows a block diagram 400 of a device 405 that supports tone reservation techniques for sidelink communications in accordance with one or more aspects of the present disclosure. The device 405 may be an example of aspects of a UE 115 as described herein. The device 405 may include a receiver 410, a transmitter 415, and a communications manager 420. The device 405 may also include a processor. Each of these components may be in communication with one another (e.g., via one or more buses).

The receiver 410 may provide a means for receiving information such as packets, user data, control information, or any combination thereof associated with various information channels (e.g., control channels, data channels, information channels related to tone reservation techniques for sidelink communications). Information may be passed on to other components of the device 405. The receiver 410 may utilize a single antenna or a set of multiple antennas.

The transmitter 415 may provide a means for transmitting signals generated by other components of the device 405. For example, the transmitter 415 may transmit information such as packets, user data, control information, or any combination thereof associated with various information channels (e.g., control channels, data channels, information channels related to tone reservation techniques for sidelink communications). In some examples, the transmitter 415 may be co-located with a receiver 410 in a transceiver module. The transmitter 415 may utilize a single antenna or a set of multiple antennas.

The communications manager 420, the receiver 410, the transmitter 415, or various combinations thereof or various components thereof may be examples of means for performing various aspects of tone reservation techniques for sidelink communications as described herein. For example, the communications manager 420, the receiver 410, the transmitter 415, or various combinations or components thereof may support a method for performing one or more of the functions described herein.

In some examples, the communications manager 420, the receiver 410, the transmitter 415, or various combinations or components thereof may be implemented in hardware (e.g., in communications management circuitry). The hardware may include a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 420, the receiver 410, the transmitter 415, or various combinations or components thereof may be implemented in code (e.g., as communications management software or firmware) executed by a processor. If implemented in code executed by a processor, the functions of the communications manager 420, the receiver 410, the transmitter 415, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 420 may be configured to perform various operations (e.g., receiving, obtaining, monitoring, outputting, transmitting) using or otherwise in cooperation with the receiver 410, the transmitter 415, or both. For example, the communications manager 420 may receive information from the receiver 410. The communications manager 420 may send information to the transmitter 415. The communications manager 420 may be integrated in combination with the receiver 410, the transmitter 415, or both to obtain information, output information, or perform various other operations as described herein.

The communications manager 420 may support wireless communications at a first UE in accordance with examples as disclosed herein. For example, the communications manager 420 may be configured as or otherwise support a means for identifying one or more subcarriers of a set of multiple subcarriers, the one or more subcarriers associated with a tone reservation signal for sidelink signaling. The communications manager 420 may be configured as or otherwise support a means for selecting one or more symbols for transmitting the tone reservation signal on the one or more subcarriers. The communications manager 420 may be configured as or otherwise support a means for transmitting, to a second UE, the sidelink signaling over the set of multiple subcarriers on a sidelink, where the sidelink signaling includes the tone reservation signal over the one or more subcarriers during the one or more symbols.

Additionally, or alternatively, the communications manager 420 may support wireless communications at a second UE in accordance with examples as disclosed herein. For example, the communications manager 420 may be configured as or otherwise support a means for receiving, from a first UE, sidelink signaling over a set of multiple subcarriers on a sidelink connection. The communications manager 420 may be configured as or otherwise support a means for identifying a tone reservation signal during one or more symbols associated with one or more subcarriers. The communications manager 420 may be configured as or otherwise support a means for decoding the sidelink signaling based on identifying the tone reservation signal.

By including or configuring the communications manager 420 in accordance with examples as described herein, the device 405 (e.g., a processor controlling or otherwise coupled with the receiver 410, the transmitter 415, the communications manager 420, or a combination thereof) will support tone reservation techniques for sidelink signaling which will support more accurate AGC calibration, improved sidelink performance, and improved channel estimation which may result in reduced processing, reduced power consumption, and more efficient utilization of communication resources, among other advantages.

Figure 5:
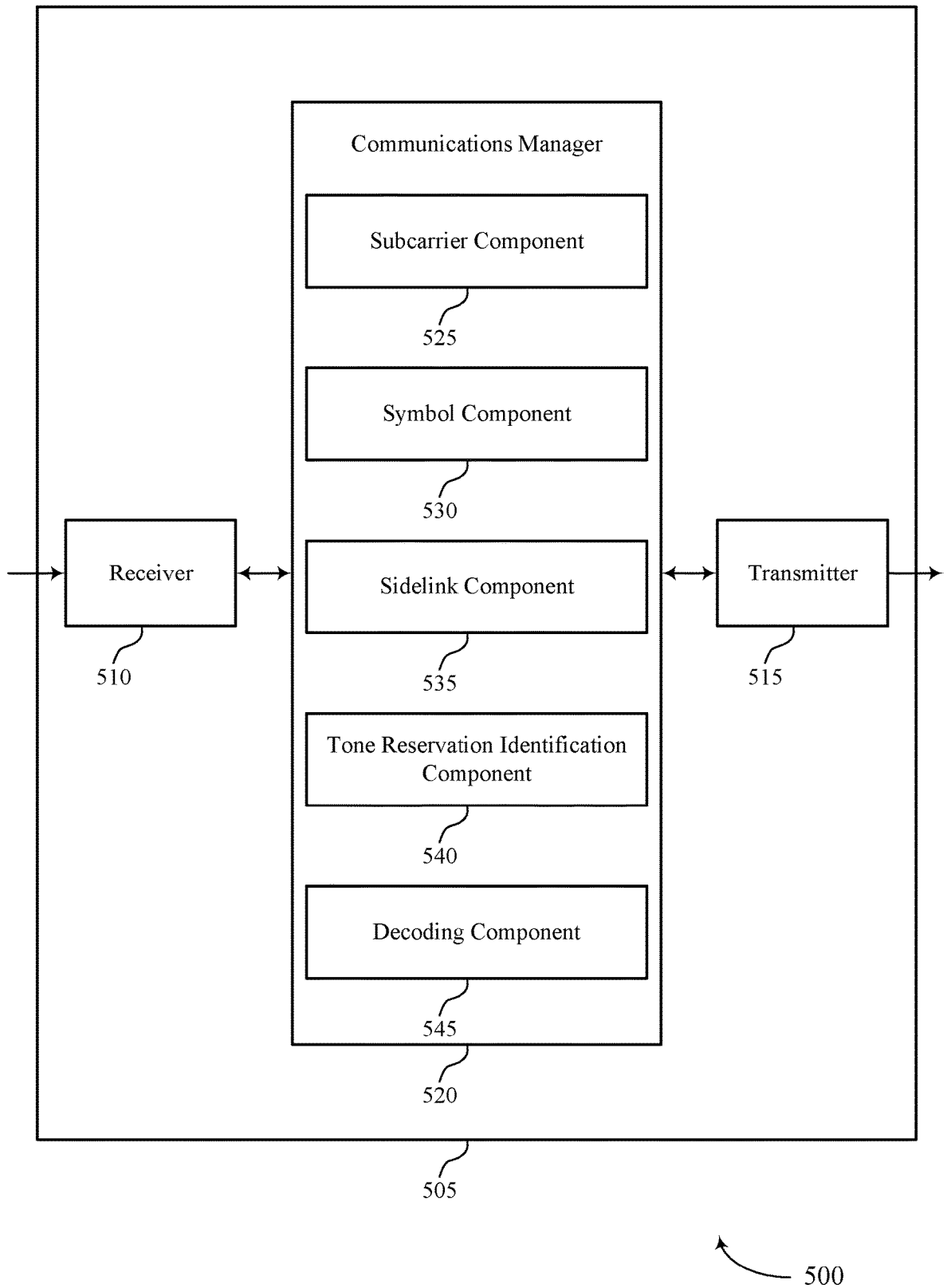

FIG. 5 shows a block diagram 500 of a device 505 that supports tone reservation techniques for sidelink communications in accordance with one or more aspects of the present disclosure. The device 505 may be an example of aspects of a device 405 or a UE 115 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to tone reservation techniques for sidelink communications). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to tone reservation techniques for sidelink communications). In some examples, the transmitter 515 may be co-located with a receiver 510 in a transceiver module. The transmitter 515 may utilize a single antenna or a set of multiple antennas.

The device 505, or various components thereof, may be an example of means for performing various aspects of tone reservation techniques for sidelink communications as described herein. For example, the communications manager 520 may include a subcarrier component 525, a symbol component 530, a sidelink component 535, a tone reservation identification component 540, a decoding component 545, or any combination thereof. The communications manager 520 may be an example of aspects of a communications manager 420 as described herein. In some examples, the communications manager 520, or various components thereof, may be configured to perform various operations (e.g., receiving, obtaining, monitoring, outputting, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to obtain information, output information, or perform various other operations as described herein.

The communications manager 520 may support wireless communications at a first UE in accordance with examples as disclosed herein. The subcarrier component 525 may be configured as or otherwise support a means for identifying one or more subcarriers of a set of multiple subcarriers, the one or more subcarriers associated with a tone reservation signal for sidelink signaling. The symbol component 530 may be configured as or otherwise support a means for selecting one or more symbols for transmitting the tone reservation signal on the one or more subcarriers. The sidelink component 535 may be configured as or otherwise support a means for transmitting, to a second UE, the sidelink signaling over the set of multiple subcarriers on a sidelink, where the sidelink signaling includes the tone reservation signal over the one or more subcarriers during the one or more symbols.

Additionally, or alternatively, the communications manager 520 may support wireless communications at a second UE in accordance with examples as disclosed herein. The sidelink component 535 may be configured as or otherwise support a means for receiving, from a first UE, sidelink signaling over a set of multiple subcarriers on a sidelink connection. The tone reservation identification component 540 may be configured as or otherwise support a means for identifying a tone reservation signal during one or more symbols associated with one or more subcarriers. The decoding component 545 may be configured as or otherwise support a means for decoding the sidelink signaling based on identifying the tone reservation signal.

Figure 6:
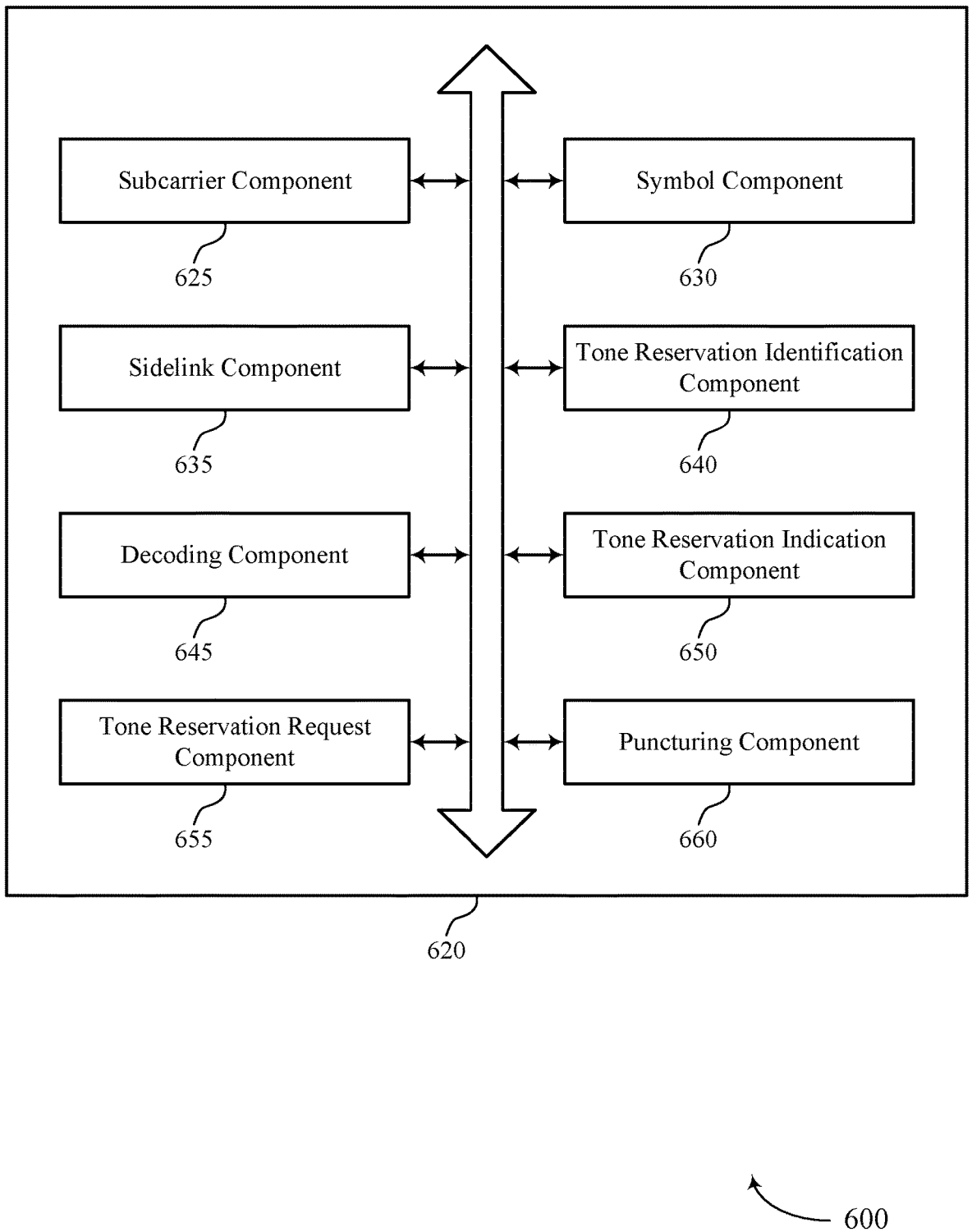
FIG. 6 shows a block diagram of a communications manager that supports tone reservation techniques for sidelink communications in accordance with one or more aspects of the present disclosure.

FIG. 6 shows a block diagram 600 of a communications manager 620 that supports tone reservation techniques for sidelink communications in accordance with one or more aspects of the present disclosure. The communications manager 620 may be an example of aspects of a communications manager 420, a communications manager 520, or both, as described herein. The communications manager 620, or various components thereof, may be an example of means for performing various aspects of tone reservation techniques for sidelink communications as described herein. For example, the communications manager 620 may include a subcarrier component 625, a symbol component 630, a sidelink component 635, a tone reservation identification component 640, a decoding component 645, a tone reservation indication component 650, a tone reservation request component 655, a puncturing component 660, or any combination thereof. Each of these components may communicate, directly or indirectly, with one another (e.g., via one or more buses).

The communications manager 620 may support wireless communications at a first UE in accordance with examples as disclosed herein. The subcarrier component 625 may be configured as or otherwise support a means for identifying one or more subcarriers of a set of multiple subcarriers, the one or more subcarriers associated with a tone reservation signal for sidelink signaling. The symbol component 630 may be configured as or otherwise support a means for selecting one or more symbols for transmitting the tone reservation signal on the one or more subcarriers. The sidelink component 635 may be configured as or otherwise support a means for transmitting, to a second UE, the sidelink signaling over the set of multiple subcarriers on a sidelink, where the sidelink signaling includes the tone reservation signal over the one or more subcarriers during the one or more symbols.

In some examples, to support selecting the one or more symbols, the symbol component 630 may be configured as or otherwise support a means for selecting a symbol for automatic gain control, where transmitting the sidelink signaling includes. In some examples, to support selecting the one or more symbols, the sidelink component 635 may be configured as or otherwise support a means for transmitting the sidelink signaling including the tone reservation signal over the one or more subcarriers during the symbol for automatic gain control.

In some examples, the one or more subcarriers including the tone reservation signal correspond to a physical sidelink shared channel, a physical sidelink control channel, or both.

In some examples, the one or more subcarriers correspond to one or more most significant subcarrier indexes of the set of multiple subcarriers associated with a physical sidelink shared channel, or a physical sidelink control channel, or both.

In some examples, to support selecting the one or more symbols, the symbol component 630 may be configured as or otherwise support a means for selecting the one or more symbols that at least partially overlap with a physical sidelink control channel, where transmitting the sidelink signaling includes. In some examples, to support selecting the one or more symbols, the sidelink component 635 may be configured as or otherwise support a means for transmitting the sidelink signaling including the tone reservation signal over the one or more subcarriers during the one or more symbols that at least partially overlap with the physical sidelink control channel.

In some examples, the tone reservation indication component 650 may be configured as or otherwise support a means for transmitting an indication of the one or more subcarriers, or the one or more symbols, or both, to the second UE via sidelink control information, a medium access control (MAC) control element (CE), RRC signaling on a physical sidelink shared channel, or any combination thereof.

In some examples, to support identifying the one or more subcarriers, the tone reservation indication component 650 may be configured as or otherwise support a means for receiving control signaling configuring the physical sidelink control channel, where the control signaling indicates positions for the one or more subcarriers, the one or more symbols, or both.

In some examples, the one or more subcarriers correspond to one or more most significant subcarrier indexes of the set of multiple subcarriers associated with a physical sidelink shared channel, or a physical sidelink control channel, or both.

In some examples, the puncturing component 660 may be configured as or otherwise support a means for puncturing one or more demodulation reference signals on the one or more subcarriers with the tone reservation signal.

In some examples, to support selecting the one or more symbols, the symbol component 630 may be configured as or otherwise support a means for selecting the one or more symbols that at least partially overlap with a physical sidelink shared channel, where transmitting the sidelink signaling includes. In some examples, to support selecting the one or more symbols, the sidelink component 635 may be configured as or otherwise support a means for transmitting the sidelink signaling including the tone reservation signal over the one or more subcarriers during the one or more symbols that at least partially overlap with the physical sidelink shared channel.

In some examples, the one or more subcarriers of the physical sidelink shared channel during the one or more symbols are associated with sidelink control information signaling.

In some examples, the tone reservation indication component 650 may be configured as or otherwise support a means for transmitting an indication of the one or more subcarriers, or the one or more symbols, or both, to the second UE via sidelink control information, a medium access control (MAC) control element (CE), RRC signaling on a physical sidelink shared channel, or any combination thereof.

In some examples, the tone reservation indication component 650 may be configured as or otherwise support a means for receiving control signaling configuring the physical sidelink shared channel, where the control signaling indicates positions for the one or more subcarriers, the one or more symbols, or both.

In some examples, the puncturing component 660 may be configured as or otherwise support a means for puncturing one or more demodulation reference signals on the one or more subcarriers with the tone reservation signal.

In some examples, to support transmitting the sidelink signaling, the sidelink component 635 may be configured as or otherwise support a means for transmitting the sidelink signaling puncturing one or more demodulation reference signals on the one or more subcarriers with the tone reservation signal during the one or more symbols.

In some examples, the tone reservation indication component 650 may be configured as or otherwise support a means for transmitting an indication of the one or more subcarriers or the one or more symbols, or both, to the second UE via sidelink control information, a medium access control (MAC) control element (CE), RRC signaling on a physical sidelink shared channel, or any combination thereof.

In some examples, the one or more subcarriers including the tone reservation signal at least partially correspond to a physical sidelink shared channel, a physical sidelink control channel, or both.

In some examples, to support identifying the one or more subcarriers, the tone reservation indication component 650 may be configured as or otherwise support a means for receiving an indication of the one or more subcarriers associated with the tone reservation signal.

In some examples, the tone reservation request component 655 may be configured as or otherwise support a means for receiving, from the second UE, a request for the tone reservation signal.

In some examples, to support identifying the one or more subcarriers, the tone reservation indication component 650 may be configured as or otherwise support a means for receiving the request from the second UE including an indication of the one or more subcarriers associated with the tone reservation signal.

Additionally, or alternatively, the communications manager 620 may support wireless communications at a second UE in accordance with examples as disclosed herein. In some examples, the sidelink component 635 may be configured as or otherwise support a means for receiving, from a first UE, sidelink signaling over a set of multiple subcarriers on a sidelink connection. The tone reservation identification component 640 may be configured as or otherwise support a means for identifying a tone reservation signal during one or more symbols associated with one or more subcarriers. The decoding component 645 may be configured as or otherwise support a means for decoding the sidelink signaling based on identifying the tone reservation signal.

In some examples, to support receiving the sidelink signaling, the sidelink component 635 may be configured as or otherwise support a means for receiving the sidelink signaling including the tone reservation signal during a symbol for automatic gain control.

In some examples, to support receiving the sidelink signaling, the sidelink component 635 may be configured as or otherwise support a means for receiving the sidelink signaling including the tone reservation signal over the one or more subcarriers during the one or more symbols that at least partially overlap with a physical sidelink control channel, a physical sidelink shared channel, or both.

In some examples, to support receiving the sidelink signaling, the sidelink component 635 may be configured as or otherwise support a means for receiving the sidelink signaling puncturing one or more demodulation reference signals on the one or more subcarriers with the tone reservation signal during the one or more symbols.

In some examples, the tone reservation identification component 640 may be configured as or otherwise support a means for receiving an indication of the one or more subcarriers or the one or more symbols, or both, from the first UE via sidelink control information, a medium access control (MAC) control element (CE), RRC signaling on a physical sidelink shared channel, or any combination thereof.

In some examples, to support identifying the one or more subcarriers, the tone reservation identification component 640 may be configured as or otherwise support a means for receiving an indication of the one or more subcarriers associated with the tone reservation signal.

In some examples, the tone reservation request component 655 may be configured as or otherwise support a means for transmitting, to the first UE, a request for the tone reservation signal.

In some examples, to support identifying the one or more subcarriers, the tone reservation request component 655 may be configured as or otherwise support a means for transmitting the request to the first UE including an indication of the one or more subcarriers associated with the tone reservation signal.

Figure 7:
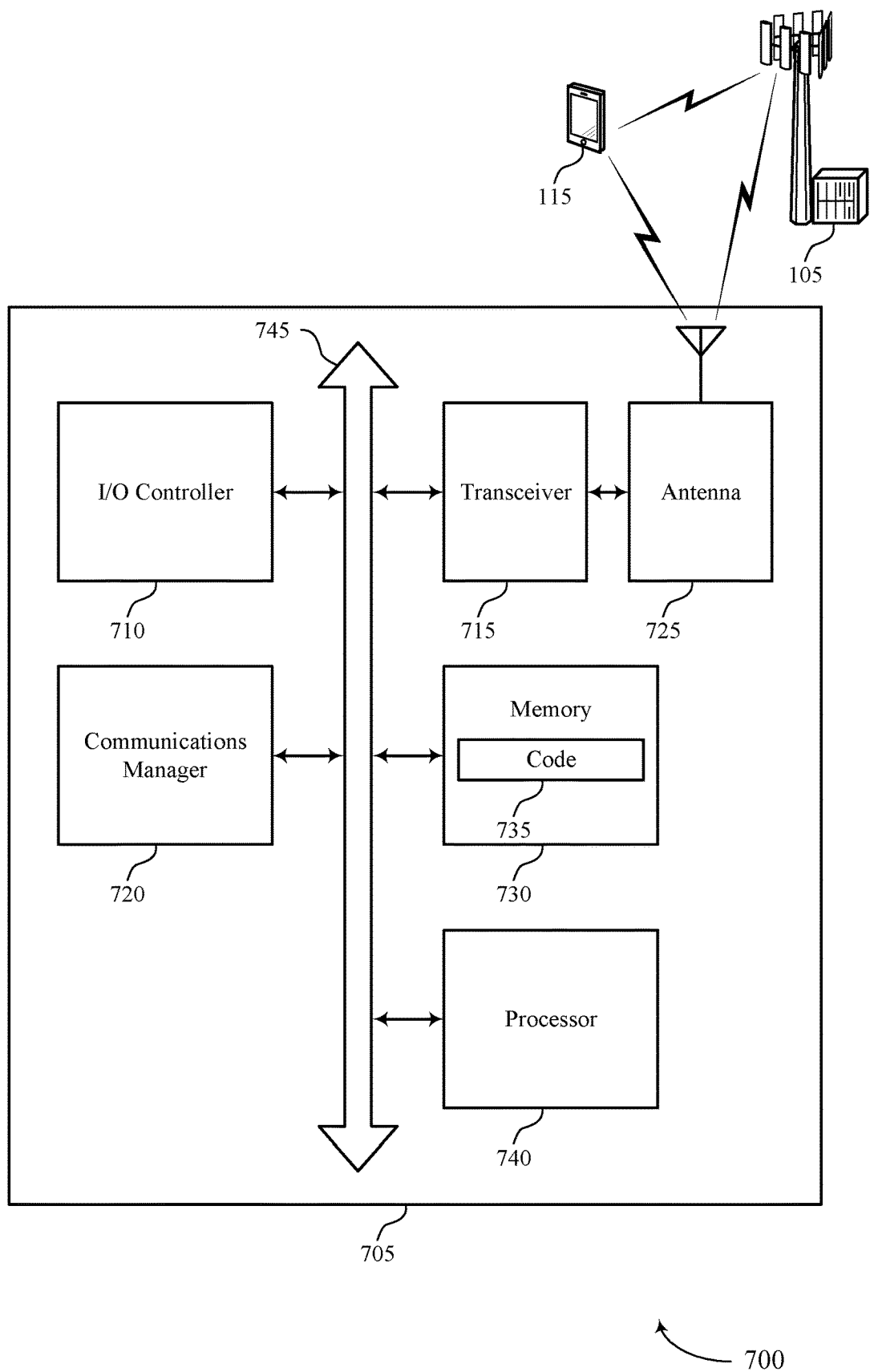
FIG. 7 shows a diagram of a system including a device that supports tone reservation techniques for sidelink communications in accordance with one or more aspects of the present disclosure.

FIG. 7 shows a diagram of a system 700 including a device 705 that supports tone reservation techniques for sidelink communications in accordance with one or more aspects of the present disclosure. The device 705 may be an example of or include the components of a device 405, a device 505, or a UE 115 as described herein. The device 705 may communicate (e.g., wirelessly) with one or more network entities 105, one or more UEs 115, or any combination thereof. The device 705 may include components for bi-directional voice and data communications including components for transmitting and receiving communications, such as a communications manager 720, an input/output (I/O) controller 710, a transceiver 715, an antenna 725, a memory 730, code 735, and a processor 740. These components may be in electronic communication or otherwise coupled (e.g., operatively, communicatively, functionally, electronically, electrically) via one or more buses (e.g., a bus 745).

The I/O controller 710 may manage input and output signals for the device 705. The I/O controller 710 may also manage peripherals not integrated into the device 705. In some cases, the I/O controller 710 may represent a physical connection or port to an external peripheral. In some cases, the I/O controller 710 may utilize an operating system such as iOS®, ANDROID®, MS-DOS®, MS-WINDOWS®, OS/2®, UNIX®, LINUX®, or another known operating system. Additionally or alternatively, the I/O controller 710 may represent or interact with a modem, a keyboard, a mouse, a touchscreen, or a similar device. In some cases, the I/O controller 710 may be implemented as part of a processor, such as the processor 740. In some cases, a user may interact with the device 705 via the I/O controller 710 or via hardware components controlled by the I/O controller 710.

In some cases, the device 705 may include a single antenna 725. However, in some other cases, the device 705 may have more than one antenna 725, which may be capable of concurrently transmitting or receiving multiple wireless transmissions. The transceiver 715 may communicate bi-directionally, via the one or more antennas 725, wired, or wireless links as described herein. For example, the transceiver 715 may represent a wireless transceiver and may communicate bi-directionally with another wireless transceiver. The transceiver 715 may also include a modem to modulate the packets, to provide the modulated packets to one or more antennas 725 for transmission, and to demodulate packets received from the one or more antennas 725. The transceiver 715, or the transceiver 715 and one or more antennas 725, may be an example of a transmitter 415, a transmitter 515, a receiver 410, a receiver 510, or any combination thereof or component thereof, as described herein.

The memory 730 may include random access memory (RAM) and read-only memory (ROM). The memory 730 may store computer-readable, computer-executable code 735 including instructions that, when executed by the processor 740, cause the device 705 to perform various functions described herein. The code 735 may be stored in a non-transitory computer-readable medium such as system memory or another type of memory. In some cases, the code 735 may not be directly executable by the processor 740 but may cause a computer (e.g., when compiled and executed) to perform functions described herein. In some cases, the memory 730 may contain, among other things, a basic I/O system (BIOS) which may control basic hardware or software operation such as the interaction with peripheral components or devices.

The processor 740 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 740 may be configured to operate a memory array using a memory controller. In some other cases, a memory controller may be integrated into the processor 740. The processor 740 may be configured to execute computer-readable instructions stored in a memory (e.g., the memory 730) to cause the device 705 to perform various functions (e.g., functions or tasks supporting tone reservation techniques for sidelink communications). For example, the device 705 or a component of the device 705 may include a processor 740 and memory 730 coupled with or to the processor 740, the processor 740 and memory 730 configured to perform various functions described herein.

The communications manager 720 may support wireless communications at a first UE in accordance with examples as disclosed herein. For example, the communications manager 720 may be configured as or otherwise support a means for identifying one or more subcarriers of a set of multiple subcarriers, the one or more subcarriers associated with a tone reservation signal for sidelink signaling. The communications manager 720 may be configured as or otherwise support a means for selecting one or more symbols for transmitting the tone reservation signal on the one or more subcarriers. The communications manager 720 may be configured as or otherwise support a means for transmitting, to a second UE, the sidelink signaling over the set of multiple subcarriers on a sidelink, where the sidelink signaling includes the tone reservation signal over the one or more subcarriers during the one or more symbols.

Additionally, or alternatively, the communications manager 720 may support wireless communications at a second UE in accordance with examples as disclosed herein. For example, the communications manager 720 may be configured as or otherwise support a means for receiving, from a first UE, sidelink signaling over a set of multiple subcarriers on a sidelink connection. The communications manager 720 may be configured as or otherwise support a means for identifying a tone reservation signal during one or more symbols associated with one or more subcarriers. The communications manager 720 may be configured as or otherwise support a means for decoding the sidelink signaling based on identifying the tone reservation signal.

By including or configuring the communications manager 720 in accordance with examples as described herein, the device 705 may support tone reservation techniques for sidelink signaling which will support more accurate AGC calibration, improved sidelink performance, and improved channel estimation which will result in improved communication reliability, reduced latency, improved user experience related to reduced processing, reduced power consumption, more efficient utilization of communication resources, improved coordination between devices, longer battery life, and improved utilization of processing capability, among other advantages.

In some examples, the communications manager 720 may be configured to perform various operations (e.g., receiving, monitoring, transmitting) using or otherwise in cooperation with the transceiver 715, the one or more antennas 725, or any combination thereof. Although the communications manager 720 is illustrated as a separate component, in some examples, one or more functions described with reference to the communications manager 720 may be supported by or performed by the processor 740, the memory 730, the code 735, or any combination thereof. For example, the code 735 may include instructions executable by the processor 740 to cause the device 705 to perform various aspects of tone reservation techniques for sidelink communications as described herein, or the processor 740 and the memory 730 may be otherwise configured to perform or support such operations.

Figure 8:
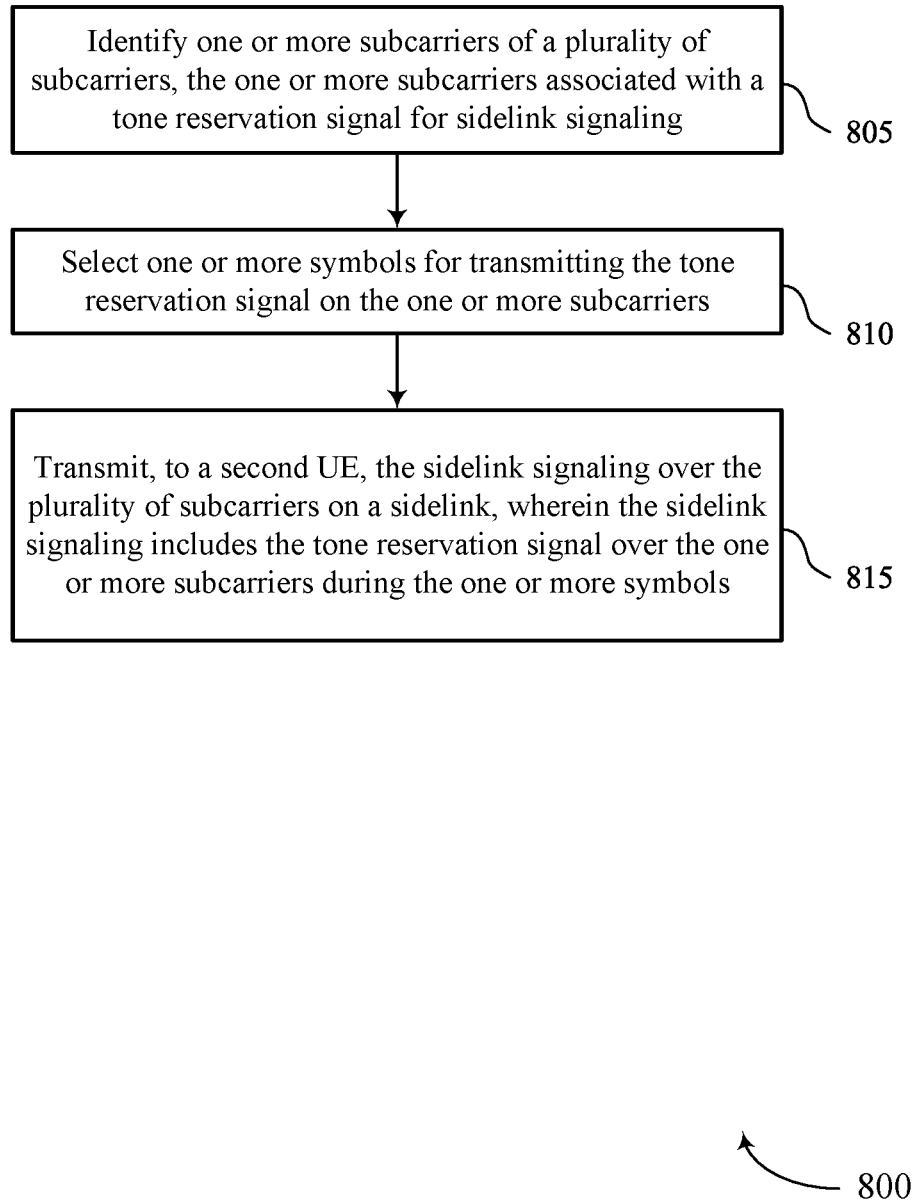
FIGS. 8 and 9 show flowcharts illustrating methods that support tone reservation techniques for sidelink communications in accordance with one or more aspects of the present disclosure.

FIG. 8 shows a flowchart illustrating a method 800 that supports tone reservation techniques for sidelink communications in accordance with one or more aspects of the present disclosure. The operations of the method 800 may be implemented by a UE or its components as described herein. For example, the operations of the method 800 may be performed by a UE 115 as described with reference to FIGS. 1 through 7. In some examples, a UE may execute a set of instructions to control the functional elements of the UE to perform the described functions. Additionally, or alternatively, the UE may perform aspects of the described functions using special-purpose hardware.

At 805, the method may include identifying one or more subcarriers of a set of multiple subcarriers, the one or more subcarriers associated with a tone reservation signal for sidelink signaling. The operations of 805 may be performed in accordance with examples as disclosed herein. In some examples, aspects of the operations of 805 may be performed by a subcarrier component 625 as described with reference to FIG. 6.

At 810, the method may include selecting one or more symbols for transmitting the tone reservation signal on the one or more subcarriers. The operations of 810 may be performed in accordance with examples as disclosed herein. In some examples, aspects of the operations of 810 may be performed by a symbol component 630 as described with reference to FIG. 6.

At 815, the method may include transmitting, to a second UE, the sidelink signaling over the set of multiple subcarriers on a sidelink, where the sidelink signaling includes the tone reservation signal over the one or more subcarriers during the one or more symbols. The operations of 815 may be performed in accordance with examples as disclosed herein. In some examples, aspects of the operations of 815 may be performed by a sidelink component 635 as described with reference to FIG. 6.

Figure 9:
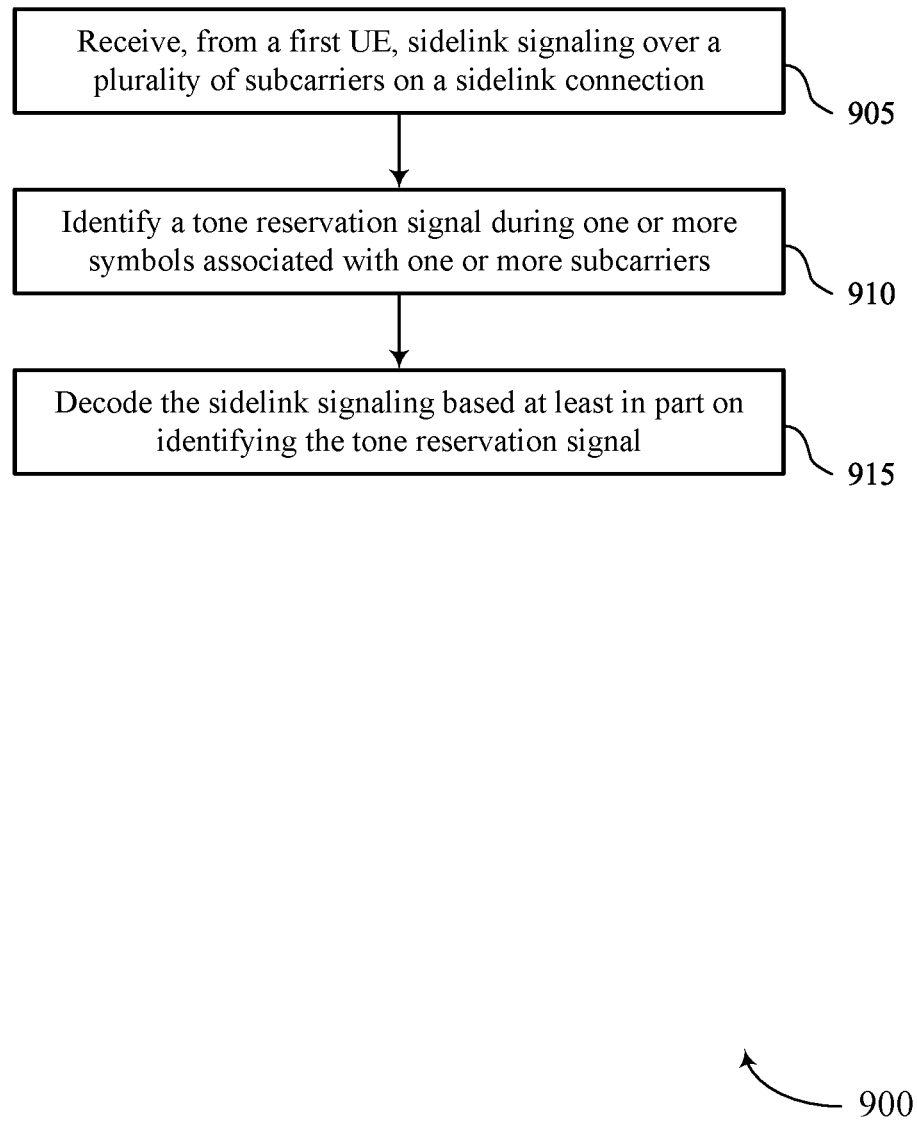

FIG. 9 shows a flowchart illustrating a method 900 that supports tone reservation techniques for sidelink communications in accordance with one or more aspects of the present disclosure. The operations of the method 900 may be implemented by a UE or its components as described herein. For example, the operations of the method 900 may be performed by a UE 115 as described with reference to FIGS. 1 through 7. In some examples, a UE may execute a set of instructions to control the functional elements of the UE to perform the described functions. Additionally, or alternatively, the UE may perform aspects of the described functions using special-purpose hardware.

At 905, the method may include receiving, from a first UE, sidelink signaling over a set of multiple subcarriers on a sidelink connection. The operations of 905 may be performed in accordance with examples as disclosed herein. In some examples, aspects of the operations of 905 may be performed by a sidelink component 635 as described with reference to FIG. 6.

At 910, the method may include identifying a tone reservation signal during one or more symbols associated with one or more subcarriers. The operations of 910 may be performed in accordance with examples as disclosed herein. In some examples, aspects of the operations of 910 may be performed by a tone reservation identification component 640 as described with reference to FIG. 6.

At 915, the method may include decoding the sidelink signaling based on identifying the tone reservation signal. The operations of 915 may be performed in accordance with examples as disclosed herein. In some examples, aspects of the operations of 915 may be performed by a decoding component 645 as described with reference to FIG. 6.

The following provides an overview of aspects of the present disclosure:

Aspect 1: A method for wireless communications at a first UE, comprising: identifying one or more subcarriers of a plurality of subcarriers, the one or more subcarriers associated with a tone reservation signal for sidelink signaling; selecting one or more symbols for transmitting the tone reservation signal on the one or more subcarriers; and transmitting, to a second UE, the sidelink signaling over the plurality of subcarriers on a sidelink, wherein the sidelink signaling includes the tone reservation signal over the one or more subcarriers during the one or more symbols.

Aspect 2: The method of aspect 1, wherein selecting the one or more symbols comprises: selecting a symbol for automatic gain control, wherein transmitting the sidelink signaling comprises: transmitting the sidelink signaling comprising the tone reservation signal over the one or more subcarriers during the symbol for automatic gain control.

Aspect 3: The method of aspect 2, wherein the one or more subcarriers including the tone reservation signal correspond to a physical sidelink shared channel, a physical sidelink control channel, or both.

Aspect 4: The method of any of aspects 2 through 3, wherein the one or more subcarriers correspond to one or more most significant subcarrier indexes of the plurality of subcarriers associated with a physical sidelink shared channel, or a physical sidelink control channel, or both.

Aspect 5: The method of any of aspects 1 through 4, wherein selecting the one or more symbols comprises: selecting the one or more symbols that at least partially overlap with a physical sidelink control channel, wherein transmitting the sidelink signaling comprises: transmitting the sidelink signaling comprising the tone reservation signal over the one or more subcarriers during the one or more symbols that at least partially overlap with the physical sidelink control channel.

Aspect 6: The method of aspect 5, further comprising: transmitting an indication of the one or more subcarriers, or the one or more symbols, or both, to the second UE via sidelink control information, a medium access control (MAC) control element (CE), RRC signaling on a physical sidelink shared channel, or any combination thereof.

Aspect 7: The method of any of aspects 5 through 6, wherein identifying the one or more subcarriers comprises: receiving control signaling configuring the physical sidelink control channel, wherein the control signaling indicates positions for the one or more subcarriers, the one or more symbols, or both.

Aspect 8: The method of any of aspects 5 through 7, wherein the one or more subcarriers correspond to one or more most significant subcarrier indexes of the plurality of subcarriers associated with a physical sidelink shared channel, or a physical sidelink control channel, or both.

Aspect 9: The method of any of aspects 5 through 8, further comprising: puncturing one or more demodulation reference signals on the one or more subcarriers with the tone reservation signal.

Aspect 10: The method of any of aspects 1 through 9, wherein selecting the one or more symbols comprises: selecting the one or more symbols that at least partially overlap with a physical sidelink shared channel, wherein transmitting the sidelink signaling comprises: transmitting the sidelink signaling comprising the tone reservation signal over the one or more subcarriers during the one or more symbols that at least partially overlap with the physical sidelink shared channel.

Aspect 11: The method of aspect 10, wherein the one or more subcarriers of the physical sidelink shared channel during the one or more symbols are associated with sidelink control information signaling.

Aspect 12: The method of any of aspects 10 through 11, further comprising: transmitting an indication of the one or more subcarriers, or the one or more symbols, or both, to the second UE via sidelink control information, a medium access control (MAC) control element (CE), RRC signaling on a physical sidelink shared channel, or any combination thereof.

Aspect 13: The method of any of aspects 10 through 12, further comprising: receiving control signaling configuring the physical sidelink shared channel, wherein the control signaling indicates positions for the one or more subcarriers, the one or more symbols, or both.

Aspect 14: The method of any of aspects 10 through 13, further comprising: puncturing one or more demodulation reference signals on the one or more subcarriers with the tone reservation signal.

Aspect 15: The method of any of aspects 1 through 14, wherein transmitting the sidelink signaling comprises: transmitting the sidelink signaling puncturing one or more demodulation reference signals on the one or more subcarriers with the tone reservation signal during the one or more symbols.

Aspect 16: The method of aspect 15, further comprising: transmitting an indication of the one or more subcarriers or the one or more symbols, or both, to the second UE via sidelink control information, a medium access control (MAC) control element (CE), RRC signaling on a physical sidelink shared channel, or any combination thereof.

Aspect 17: The method of any of aspects 15 through 16, wherein the one or more subcarriers including the tone reservation signal at least partially correspond to a physical sidelink shared channel, a physical sidelink control channel, or both.

Aspect 18: The method of any of aspects 1 through 17, wherein identifying the one or more subcarriers comprises: receiving an indication of the one or more subcarriers associated with the tone reservation signal.

Aspect 19: The method of any of aspects 1 through 18, further comprising: receiving, from the second UE, a request for the tone reservation signal.

Aspect 20: The method of aspect 19, wherein identifying the one or more subcarriers comprises: receiving the request from the second UE including an indication of the one or more subcarriers associated with the tone reservation signal.

Aspect 21: A method for wireless communications at a second UE, comprising: receiving, from a first UE, sidelink signaling over a plurality of subcarriers on a sidelink connection; identifying a tone reservation signal during one or more symbols associated with one or more subcarriers; and decoding the sidelink signaling based at least in part on identifying the tone reservation signal.

Aspect 22: The method of aspect 21, wherein receiving the sidelink signaling comprises: receiving the sidelink signaling comprising the tone reservation signal during a symbol for automatic gain control.

Aspect 23: The method of any of aspects 21 through 22, wherein receiving the sidelink signaling comprises: receiving the sidelink signaling comprising the tone reservation signal over the one or more subcarriers during the one or more symbols that at least partially overlap with a physical sidelink control channel, a physical sidelink shared channel, or both.

Aspect 24: The method of any of aspects 21 through 23, wherein receiving the sidelink signaling comprises: receiving the sidelink signaling puncturing one or more demodulation reference signals on the one or more subcarriers with the tone reservation signal during the one or more symbols.

Aspect 25: The method of any of aspects 21 through 24, further comprising: receiving an indication of the one or more subcarriers or the one or more symbols, or both, from the first UE via sidelink control information, a medium access control (MAC) control element (CE), RRC signaling on a physical sidelink shared channel, or any combination thereof.

Aspect 26: The method of any of aspects 21 through 25, wherein identifying the one or more subcarriers comprises: receiving an indication of the one or more subcarriers associated with the tone reservation signal.

Aspect 27: The method of any of aspects 21 through 26, further comprising: transmitting, to the first UE, a request for the tone reservation signal.

Aspect 28: The method of aspect 27, wherein identifying the one or more subcarriers comprises: transmitting the request to the first UE including an indication of the one or more subcarriers associated with the tone reservation signal.

Aspect 29: An apparatus for wireless communications at a first UE, comprising a processor; memory coupled with the processor; and instructions stored in the memory and executable by the processor to cause the apparatus to perform a method of any of aspects 1 through 20.

Aspect 30: An apparatus for wireless communications at a first UE, comprising at least one means for performing a method of any of aspects 1 through 20.

Aspect 31: A non-transitory computer-readable medium storing code for wireless communications at a first UE, the code comprising instructions executable by a processor to perform a method of any of aspects 1 through 20.

Aspect 32: An apparatus for wireless communications at a second UE, comprising a processor; memory coupled with the processor; and instructions stored in the memory and executable by the processor to cause the apparatus to perform a method of any of aspects 21 through 28.

Aspect 33: An apparatus for wireless communications at a second UE, comprising at least one means for performing a method of any of aspects 21 through 28.

Aspect 34: A non-transitory computer-readable medium storing code for wireless communications at a second UE, the code comprising instructions executable by a processor to perform a method of any of aspects 21 through 28.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, obtaining, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communications at a first user equipment (UE), comprising:
    identifying one or more subcarriers of a plurality of subcarriers, the one or more subcarriers associated with a tone reservation signal for sidelink signaling;
    selecting one or more symbols for transmitting the tone reservation signal on the one or more subcarriers including at least a symbol for automatic gain control; and
    transmitting, to a second UE, the sidelink signaling over the plurality of subcarriers on a sidelink, wherein the sidelink signaling includes the tone reservation signal over the one or more subcarriers during the one or more symbols including at least the symbol for automatic gain control.

2. The method of claim 1, wherein a second symbol that is subsequent to the symbol for automatic gain control comprises different information from the symbol for automatic gain control.

3. The method of claim 2, wherein the one or more subcarriers including the tone reservation signal correspond to a physical sidelink shared channel, a physical sidelink control channel, or both.

4. The method of claim 2, wherein the one or more subcarriers correspond to one or more largest subcarrier indexes of the plurality of subcarriers associated with a physical sidelink shared channel, or a physical sidelink control channel, or both.

5. The method of claim 1, wherein selecting the one or more symbols comprises:
    selecting the one or more symbols that at least partially overlap with a physical sidelink control channel, wherein transmitting the sidelink signaling comprises:
    transmitting the sidelink signaling comprising the tone reservation signal over the one or more subcarriers during the one or more symbols that at least partially overlap with the physical sidelink control channel.

6. The method of claim 5, further comprising:
    transmitting an indication of the one or more subcarriers, or the one or more symbols, or both, to the second UE via sidelink control information, a medium access control (MAC) control element (CE), radio resource control (RRC) signaling on a physical sidelink shared channel, or any combination thereof.

7. The method of claim 5, wherein identifying the one or more subcarriers comprises:
    receiving control signaling configuring the physical sidelink control channel, wherein the control signaling indicates positions for the one or more subcarriers, the one or more symbols, or both.

8. The method of claim 5, wherein the one or more subcarriers correspond to one or more largest subcarrier indexes of the plurality of subcarriers associated with a physical sidelink shared channel, or a physical sidelink control channel, or both.

9. The method of claim 5, further comprising:
    puncturing one or more demodulation reference signals on the one or more subcarriers with the tone reservation signal.

10. The method of claim 1, wherein selecting the one or more symbols comprises:
    selecting the one or more symbols that at least partially overlap with a physical sidelink shared channel, wherein transmitting the sidelink signaling comprises:
    transmitting the sidelink signaling comprising the tone reservation signal over the one or more subcarriers during the one or more symbols that at least partially overlap with the physical sidelink shared channel.

11. The method of claim 10, wherein the one or more subcarriers of the physical sidelink shared channel during the one or more symbols are associated with sidelink control information signaling.

12. The method of claim 10, further comprising:
    transmitting an indication of the one or more subcarriers, or the one or more symbols, or both, to the second UE via sidelink control information, a medium access control (MAC) control element (CE), radio resource control (RRC) signaling on a physical sidelink shared channel, or any combination thereof.

13. The method of claim 10, further comprising:
    receiving control signaling configuring the physical sidelink shared channel, wherein the control signaling indicates positions for the one or more subcarriers, the one or more symbols, or both.

14. The method of claim 10, further comprising:
    puncturing one or more demodulation reference signals on the one or more subcarriers with the tone reservation signal.

15. The method of claim 1, wherein transmitting the sidelink signaling comprises:
   transmitting the sidelink signaling puncturing one or more demodulation reference signals on the one or more subcarriers with the tone reservation signal during the one or more symbols.

16. The method of claim 15, further comprising:
   transmitting an indication of the one or more subcarriers or the one or more symbols, or both, to the second UE via sidelink control information, a medium access control (MAC) control element (CE), radio resource control (RRC) signaling on a physical sidelink shared channel, or any combination thereof.

17. The method of claim 15, wherein the one or more subcarriers including the tone reservation signal at least partially correspond to a physical sidelink shared channel, a physical sidelink control channel, or both.

18. The method of claim 1, wherein identifying the one or more subcarriers comprises:
   receiving an indication of the one or more subcarriers associated with the tone reservation signal.

19. The method of claim 1, further comprising:
   receiving, from the second UE, a request for the tone reservation signal.

20. The method of claim 19, wherein identifying the one or more subcarriers comprises:
   receiving the request from the second UE including an indication of the one or more subcarriers associated with the tone reservation signal.

21. A method for wireless communications at a second user equipment (UE), comprising:
   receiving, from a first UE, sidelink signaling over a plurality of subcarriers on a sidelink connection;
   identifying a tone reservation signal during one or more symbols associated with one or more subcarriers including at least a symbol for automatic gain control; and
   decoding the sidelink signaling based at least in part on identifying the tone reservation signal.

22. The method of claim 21, wherein a second symbol that is subsequent to the symbol for automatic gain control comprises different information from the symbol for automatic gain control.

23. The method of claim 21, wherein receiving the sidelink signaling comprises:
   receiving the sidelink signaling comprising the tone reservation signal over the one or more subcarriers during the one or more symbols that at least partially overlap with a physical sidelink control channel, a physical sidelink shared channel, or both.

24. The method of claim 21, wherein receiving the sidelink signaling comprises:
   receiving the sidelink signaling puncturing one or more demodulation reference signals on the one or more subcarriers with the tone reservation signal during the one or more symbols.

25. The method of claim 21, further comprising:
   receiving an indication of the one or more subcarriers or the one or more symbols, or both, from the first UE via sidelink control information, a medium access control (MAC) control element (CE), radio resource control (RRC) signaling on a physical sidelink shared channel, or any combination thereof.

26. The method of claim 21, wherein identifying the one or more subcarriers comprises:
   receiving an indication of the one or more subcarriers associated with the tone reservation signal.

27. The method of claim 21, further comprising:
   transmitting, to the first UE, a request for the tone reservation signal.

28. The method of claim 27, wherein identifying the one or more subcarriers comprises:
   transmitting the request to the first UE including an indication of the one or more subcarriers associated with the tone reservation signal.

29. An apparatus for wireless communications at a first user equipment (UE), comprising:
   at least one processor;
   at least one memory coupled with the at least one processor; and
   instructions stored in the at least one memory and executable by the at least one processor to cause the apparatus to:
   identify one or more subcarriers of a plurality of subcarriers, the one or more subcarriers associated with a tone reservation signal for sidelink signaling;
   select one or more symbols for transmitting the tone reservation signal on the one or more subcarriers including at least a symbol for automatic gain control; and
   transmit, to a second UE, the sidelink signaling over the plurality of subcarriers on a sidelink, wherein the sidelink signaling includes the tone reservation signal over the one or more subcarriers during the one or more symbols including at least the symbol for automatic gain control.

30. An apparatus for wireless communications at a second user equipment (UE), comprising:
   at least one processor;
   at least one memory coupled with the at least one processor; and
   instructions stored in the at least one memory and executable by the at least one processor to cause the apparatus to:
   receive, from a first UE, sidelink signaling over a plurality of subcarriers on a sidelink connection including at least a symbol for automatic gain control;
   identify a tone reservation signal during one or more symbols associated with one or more subcarriers; and
   decode the sidelink signaling based at least in part on identifying the tone reservation signal.

* * * * *